United States Patent [19]
Bussing et al.

[11] Patent Number: 5,855,827
[45] Date of Patent: Jan. 5, 1999

[54] PULSE DETONATION SYNTHESIS

[75] Inventors: Thomas R. A. Bussing, Issaquah; Joseph M. Ting, Redmond, both of Wash.

[73] Assignee: Adroit Systems, Inc., Alexandria, Va.

[21] Appl. No.: 613,194

[22] Filed: Mar. 8, 1996

Related U.S. Application Data

[63] Continuation-in-part of Ser. No. 205,505, Mar. 4, 1994, Pat. No. 5,513,489, which is a continuation-in-part of Ser. No. 45,771, Apr. 14, 1993, Pat. No. 5,345,588.

[51] Int. Cl.⁶ .................... B29B 9/00; B05D 1/36
[52] U.S. Cl. .................... 264/7; 264/10; 264/12; 427/470; 427/473; 427/446
[58] Field of Search ............... 427/470, 473, 427/446; 264/7, 10, 12

[56] References Cited

U.S. PATENT DOCUMENTS

| | | | |
|---|---|---|---|
| 4,469,722 | 9/1984 | Danielson et al. | 427/455 |
| 4,897,282 | 1/1990 | Kniseley et al. | 427/455 |
| 5,087,434 | 2/1992 | Frenklach et al. | 427/575 |
| 5,093,149 | 3/1992 | Doehler et al. | 427/575 |
| 5,112,458 | 5/1992 | Nakayama et al. | 427/577 |
| 5,141,776 | 8/1992 | Merzhanov et al. | 427/255.2 |
| 5,152,819 | 10/1992 | Blackwell et al. | 427/255.1 |
| 5,433,977 | 7/1995 | Sarin et al. | 427/450 |

OTHER PUBLICATIONS

Avalone, Eugene A., et al., *Marks' Standard Handbook for Mechanical Engineers*, Ninth Ed., McGraw–Hill Book Co., New York, 1987, pp. 6–172.

Borisov, A.A., et al. "Ignition of Dust Suspensions Behind Shock Waves," *Dynamics of Shock Waves, Explosions, and Detonations*, vol. 94, AIAA Progress in Astronautics and Aeronautics, 1984. pp. 332–339.

Che, et al., "Microstructures of SiCp/MR64 Composite prepared by Detonation–Gaseous Spray Deposition of Mechanically Alloyed Powders," *Scripta Metallurgica et Materialia*, vol. 31, No. 1, pp. 43–46, 1994.

The Committee on Ceramic Processing, Materials Advisory Board, Division of Engineering, National Research Council, "Ceramic Processing," Publication 1576, National Academy of Sciences, Washington, D.C., 1968. pp. 1–17.

Cook, Lawrence P., "Phase Equilibria of Alumina," *Science and Technology Handbook: Alumina Chemicals*, L.D. Hart editor, The American Ceramic Society, Inc., Westerville, OH, 1990, pp. 49–61.

Glassman, Irvin, *Combustion*, Academic Press, Inc., San Diego, 1987. pp. 197–237.

Khasainov, B.A., et al., "Effect of Losses on the Existence of Non–ideal Detonations in Hybrid Two–Phase Mixtures," *Dynamic Aspects of Detonations AIAA, Progress in Astronautics and Aeronautics*, vol. 153, 1993, pp. 447–461.

(List continued on next page.)

*Primary Examiner*—Shrive Beck
*Assistant Examiner*—Bret Chen
*Attorney, Agent, or Firm*—Collier, Shannon, Rill & Scott, PLLC

[57] ABSTRACT

A Pulse Detonation Synthesis (PDS) process for the manufacture and deposition of ceramic powders and coatings is disclosed. PDS may use multiple detonation pulses that are initiated in a reaction chamber to synthesize ceramic materials from reactants introduced into the chamber. The reactants may be provided in the form of divided solids, gases, liquids, gels, and/or mixtures of the foregoing. The synthesized ceramic materials may take the form of micron and/or nano-scale powders or coatings. Non-coating powders may be collected for later use. The coatings produced by the present invention include, but are not limited to, gradient coatings, uniform coatings, thermal barrier coatings, and other commercially useful coatings.

74 Claims, 11 Drawing Sheets

OTHER PUBLICATIONS

Koller A., *Structure and Properties of Ceramics*, Elsevier, Amsterdam, 1994, pp. 438.

"Market Share Reporter," 1994, pp. 868, 875–876.

Richerson, David W., *Modern Ceramic Engineering: Properties, Processing, and Use in Design*, Marcel Deckker, Inc., New York, 1982, pp. 147–177.

Shaw, K.G., et al., "Fabrication of Composite Spray Powders Using Reaction Synthesis," *Proceedings of the 7th National Thermal Spray Conference*, 20–24 Jun., 1994, Boston, MA, pp. 509–514.

Sutton George P., *Rocket Propulsion Elements: An Introduction to the Engineering of Rockets*, Fifth Edition, John Wiley & Sons, New York, 1986, pp. 295–296.

Technology Applications Office, Ballistic Missile Defense Organization, "SDI High Technology Update," vol. 3, No. 1, Summer 1993.

Veyssiere, B., et al., "A Model for Steady, Plane, Double–Gront Detonations (DFD) in Gaseous Explosive Mixtures with Aluminum Particles in Suspension," *Combustion and Flame*, vol. 85, 1991, pp. 241–253.

Veyssiere, B., et al., "The Propagation Regimes of Non–Ideal Detonations in Combustible Gaseous Mixtures with Reactive Solid Particles," *Khimicheskaya Fizika*, vol. 10, No. 11, 1991, pp. 1533–1544. No Translation.

Veyssiere, B., "Structure of the Detonations in Gaseous Mixtures Containing Aluminum Particles in Suspension," *Dynamics of Explosions AIAA Progress in Astronautics and Aeronautics*, vol. 106, 1986, pp. 522–543.

Veyssiere, B., "Double–Front Detonations in Gas–Solid Particles Mixtures" *Dynamics of Shock Waves, Explosions, and Detonations, AIAA Progress in Astronautics and Aeronautics*, vol. 94, 1984. pp. 264–276.

Veyssiere, B., et al., "Detonation characteristics of two ethylene–oxygen–nitrogen mixtures containing aluminum particles in suspension," *Gasdynamics of Detonations and Explosions, AIAA Progress in Astronautics and Aeronautics*, vol. 75, pp. 423–438, 1981.

Wolanski, P., "Deflagration and Detonation Combustion of Dust Mixtures," *Dynamics of Deflagrations and Reactive Systems: Heterogeneous Combustion, AIAA Progress in Astronautics and Aeronautics*, vol. 132, pp. 3–31, 1993.

PULSE DETONATION SYNTHESIS

CROSS REFERENCE TO RELATED PATENT APPLICATIONS

This application is a Continuation-in-Part of prior U.S. Pat. application Ser. No. 08/205,505, filed Mar. 4, 1994, now U.S. Pat. No. 5,513,489, which was a Continuation-in-Part of prior U.S. application Ser. No. 08/045,771 filed Apr. 14, 1993, now U.S. Pat. No. 5,353,588, issued Oct. 11, 1994.

BACKGROUND OF THE INVENTION

The present invention relates to a process for synthesizing engineering materials using intermittent combustion, or pulse detonation, processes, the engineering materials formed by those processes, and the apparatus for making them. The present invention has particular utility in the synthesis of ceramic materials. It has long been recognized that ceramic materials possess certain properties which are superior to other "engineering materials". They may be tailored for specific applications requiring outstanding heat transfer, resistance to thermal shock, corrosion resistance, wear resistance, specific optical properties, etc.

Conventional ceramic processing techniques usually involve several steps. First, raw materials must be purified into basic ceramic materials. Second, the product is fabricated into the desired shape or form. Third, the product undergoes an initial drying phase. Fourth, the part must be heated to allow the microstructure of the material to mature into its final form. This step is also called sintering. Depending on the specific requirements of the end product, additional processing or finishing steps may be necessary.

Most base ceramic powders are manufactured using chemical techniques that require several intermediate steps and are fairly slow. Examples are the sol-gel, solvent evaporation, and various precipitation techniques. These processes tend to yield small amounts of relatively inconsistent powders that typically require further processing.

Most prior processes produce relatively coarse particles. The ideal particles for dense, strong microstructures are fine and spherical. Fine powders on the order of 1 $\mu$m typically are produced using mechanical means such as ball milling. The ceramic powder is placed in a container containing a liquid and a generating media such as $Al_2O_3$ or $ZrO_2$. The container is rotated for several hours to reduce the particle size. The resulting powders, however, are jagged, which makes them hard to handle, pack, and sinter. The flow characteristics of the resulting powders are particularly affected. The powders also are often contaminated with pieces of the milling media or container.

The ideal particles for manufacturing a strong ceramic structure, for example, a nose cone for a missile, are spherical and have a fine grain size ranging from 0.1 to 10 $\mu$m. The particles preferably do not have a uniform size. Rather, to provide better packing, a distribution of particle sizes is preferred. By way of illustration, visualize a large box. Regardless whether the box is filled with basketballs, baseballs, or marbles, the pore space (the empty space between the spheres) will be the same. This is true because pore volume is a function of geometry, not size. If, however, each of the three types of objects were mixed in the same box, the pore volume would be greatly decreased. This is because the baseballs would occupy the spaces between the basketballs, and the marbles would occupy the spaces left between the other two. This is a more efficient packing method. Occasionally, voids may be desirable, as in the case of thermal insulation. For wear and strength applications, however, higher density is generally more desirable. Higher purity powders typically produce higher purity ceramic structures.

Spray processes such as flame plasma spraying, melt and then resolidify powders. The particles are generally spherical. Their size depends on many factors, including rheology, cooling, and precipitation rate. Neither of the concepts of using combustion to synthesize materials or using thermal spray techniques to manufacture ceramic powders is new. In 1968, the National Academy of Sciences assigned the Materials Advisory Board of the Academy the task of exploring solutions to problems faced by the Department of Defense. The committee performing the study recommended exploring the use of molten-particle or thermal spray processes for: the manufacture of fine, spherical ceramic powders; the production of high-purity oxide "smoke" by burning high-purity metals in oxygen; and the manufacture of uniform, reliable, free-standing structural ceramics. The Committee on Ceramic Processing, Materials Advisory Board, Division of Engineering, National Research Council, "Ceramic Processing" Publication #1576, National Academy of Sciences, Washington, D.C., 1968 ("NAS Report"). Spherical ceramic powders are highly desirable for thermal spray coatings and for the manufacture of solid, free-standing structures. Spherical particles lack surface irregularities which can cause snagging and agglomeration, one of the biggest problems in handling fine ceramic powders.

Since the NAS Report was issued, there has been much research into the use of spray processes and/or combustion to produce ceramic materials. Many of the spray processes are known as "aerosol processes." These typically involve combustion, which is used to drive a chemical reaction, rather than to directly produce a material. Currently, there are several different approaches to the production of ceramic powders using aerosol processes. These processes include flame, plasma, condensation, reaction, and spray pyrolysis processes. Aerosol spray processes such as flame and plasma are fairly mature technologies. Their primary use is not to manufacture powders, but to deposit coatings from precursor powders. For example, a tungsten carbide coating is manufactured from tungsten carbide powder. (These coatings typically are used for wear and thermal barrier applications.) In general, these processes each involve the injection of a precursor feed material into a flame. The powders react, vaporize, and then condense to produce a ceramic powder. The features of these processes are given in Table I.

TABLE I

Typical Characteristics of Powders Produced by Aerosol Processes

| Process | Particle Diameter | Particle Shape |
| --- | --- | --- |
| Flame | 0.001 to 0.5 $\mu$m | Aggregates |
| Plasma | 0.001–1 $\mu$m | Spherical or Aggregates |
| Condensation | 0.001 to –10 $\mu$m | Spherical |
| Reaction | 0.001 to –10 $\mu$m | Spherical or Aggregates |
| Spray Pyrolysis | 0.1 to 10 $\mu$m | Spherical or Broken Shells |

The commercialization of these processes has been limited. Even though they may be technically feasible, little was known about how they actually worked. This lack of understanding made the design of large scale production facilities difficult. Some of these gaps have since been filled through systematic study. Nonetheless, the results yielded on a small laboratory scale are often difficult, if not impossible, to extrapolate to a full-scale production facility.

One alternative ceramic processing technique is self-propagating, high-temperature synthesis ("SHS"). SHS reactions usually involve the combustion of two solid phase materials. For example, to manufacture titanium boride ($TiB_2$), titanium and boron are mixed and burned. The reaction is described by: $Ti+2B=>TiB_2$. The resulting combustion reaction is highly exothermic, that is, once the components start reacting, a large amount of heat is released which keeps the reaction going (hence, the designation self-propagating). The preparation rate of an SHS reaction, however, is relatively slow.

Engineering materials are often called upon to perform in particularly harsh environments. For example, aerospace applications have extremely demanding technical requirements. High G loading and thermal heating require strong, lightweight, environmentally resistant structures. Currently, there is no shortage of candidate high performance materials that can be used to manufacture these structures. Superalloys, ceramics, composites, and cermet materials can be used at temperatures up to several thousand degrees Kelvin. The problem in selecting between these materials in these applications is not satisfactory technical performance but, rather, reasonable cost. These materials can be stronger and lighter than conventional aerospace materials when processed correctly and can be used at much higher temperatures. Unfortunately, their price is often prohibitive. For example, 1 micron, 99.9% silicon nitride powder can cost $77 per 100 g.

Several prior patents disclose the production of certain types of coatings or the use of various combustion processes to apply coating materials. Nevgod, et al., U.S. Pat. No. 4,669,658 (Jun. 2, 1987) for GAS DETONATION COATING APPARATUS, is directed to a coating apparatus. The invention comprises a barrel enclosed in a casing, a spark plug associated with the barrel, a gas supply system, a buffer unit, and a powder supply system. A combustible gas is detonated which forces the powder through a muzzle at the end of the barrel in order to coat a substrate. No synthesis is accomplished. This is merely a coating process. Another patent to Nevgod, et al., U.S. Pat. No. 4,687,135 (Aug. 18, 1987) for DETONATION-GAS APPARATUS FOR APPLYING COATINGS, is directed to another coating apparatus. The invention lies in a specific gas distribution system.

Jackson, U.S. Pat. No. 4,902,539 for FUEL-OXIDANT MIXTURE FOR DETONATION GUN FLAME-PLATING issued on Feb. 20, 1990 is directed to a process for flame plating which uses a particularized fuel-oxidant mixture. Similarly of interest in this regard is a patent to Ulyanitsky, et al., U.S. Pat. No. 5,052,619 for BARREL OF AN APPARATUS FOR APPLYING COATINGS BY GAS DETONATION, issued on Oct. 1, 1991, is directed to a coating apparatus. As is the case with other prior art inventions, this patent is directed to coating, and not synthesis of materials.

Other patents were directed to material synthesis. For example, Taylor, U.S. Pat. No. 5,073,433 for THERMAL BARRIER COATING FOR SUBSTRATES AND PROCESS FOR PRODUCING IT, issued Dec. 17, 1991 is directed to a stabilized zirconia coating material and a process for making the same. Both Sue, et al., U.S. Pat. No. 5,185,211 for NON-STOICHIOMETRIC TITANIUM NITRIDE COATING, issued Feb. 9, 1993 and Sue, et al., U.S. Pat. No. 5,242,753 for SUBSTOIHIOMETRIC ZIRCONIUM NITRIDE COATING, issued Sep. 7, 1993 are directed to a particularized coating materials.

In spite of the existence of these prior materials synthesis and application processes, there remains a significant need for a commercially feasible method for synthesizing and applying engineering materials, particularly in high performance applications. Particularly, in applications which require extreme performance, there continues to be a substantial need for simple, reliable, and low-cost material synthesis and application techniques.

SUMMARY OF THE INVENTION

In response to this challenge, Applicants have developed an innovative, economical, and flexible Pulse Detonation Syntheses (PDS) process, for the manufacture and deposition of ceramic powders and coatings. PDS improves on two mature technologies: thermal spraying and self-propagating, high temperature synthesis (SHS). The present invention uses combustion to synthesize ceramic materials which can be in the form of powders (micron or nano scale), or coatings. Micron scale powders are on the order of $10^{-6}$ meters and nano scale powders are on the order of $10^{-9}$ meters. The coatings produced by the present invention include, but are not limited to, gradient coatings, uniform coatings, stream coatings, and other commercially useful coatings. Unlike other combustion processes for the synthesis of ceramic materials such as SHS, the present invention uses unsteady, detonative combustion rather than deflagrative combustion. The detonation reaction occurs in time scales on the order of milliseconds, thus promising high processing rate as well as high energy efficiency. The inventors believe that the present invention will produce better final materials and better final coatings, faster and at lower cost than current processes.

The process of the present invention can be used to create oxides, nitrides, carbides, and composite materials such as ceramics, among others. The new process can also be used to coat substrates, such as turbine blades, machine tools, wire guides, mechanical rollers, pistons, and various other products. The coatings may be of single or multiple layers of identical or different materials. Applicants have experimentally demonstrated the PDS process for both the production of powders and coatings.

PDS is a combustion process characterized by the propagation of a shock wave followed by a closely coupled reaction zone. Under certain circumstances, the close coupling can lead to a detonation. A detonation is a supersonic combustion wave that typically propagates at a few thousand meters per second relative to an unburned fuel/oxidizer mixture. Detonation is a much more energetic phenomenon than deflagration and produces large overpressures. A detonation wave compresses a fluid, increasing its pressure and density, in addition to increasing its temperature. Detonations can be approximated as supersonic shock waves that initiate and are closely coupled to a thin flame front or combustion region. Due to the high speed nature of a detonation wave, detonation closely approximates a constant volume combustion process.

In one embodiment of the PDS process of the present invention, the detonation wave synthesizes ceramic material. Because of the high speeds of a detonation wave passing through a fuel/oxidizer mixture, PDS conversion is rapid. Combustion, in contrast, proceeds by deflagration, which is substantially slower. Detonation may be thought of as a supersonic form of combustion, as opposed to deflagration which is a subsonic form of combustion.

The present invention uses detonative combustion to synthesize ceramic materials from precursor materials and oxidizers. The precursor materials may be in the form of solids (powders), liquids, gases, gels, and essentially any other phase or state that will work. In addition, they may be combined in any imaginable permutation thereof. E.g. solid-solid, solid-liquid, liquid-gas, liquid-gel, solid-gel, etc. Because the materials are suspended in a gas, PDS may be considered to be an aerosol process. Detonations are more often associated with explosives but many common fuels, including liquid and gaseous hydrocarbons, can be detonated under the correct conditions.

Table II, taken from *Combustion* by Irvin Glassman [1987] summarizes some of the differences between detonation and deflagration in gases. As Table II shows, a detonation wave propagates much faster through a gas, raising pressures and temperatures to a higher level than deflagration.

TABLE II

| | Typical Relative Magnitude | |
|---|---|---|
| Ratio | Detonation | Deflagration |
| Mach Number, $u_u/c_u$* | 5–10 | 0.0001–0.03 |
| Velocity, $u_u/u_u$ | 0.4–0.7 | 4–16 |
| Pressure, $P_b/P_u$ | 13–55 | 0.98–0.976 |
| Temperature, $T_b/T_u$ | 8–21 | 4–16 |
| Density, $P_b/P_u$ | 1.4–2.6 | 0.06–0.25 |

*$c_u$ is the acoustic velocity in the unburned gases. $u_u/c_u$ is the Mach number of the wave. b is a quantity of unburned gas, u is a quantity of burned gas.

The invention is a process for synthesizing materials, the materials formed using that process, and an apparatus that employs that process to synthesize those materials. In particular, the invention is a process for synthesizing a material comprising: suspending at least one material reactant in a reactant gas inside at least one detonation chamber of a pulse detonation combustor; and initiating a pulse supersonic shock wave-trigger detonation combustion wave in said combustion chamber with a fuel source to form a synthesized material. The invention also comprises a material formed by using a pulse detonation combustion process to modify a reactant in order to synthesize the material. One further benefit of the invention is the application of the material that is formed in the process to a product, such as turbine blades, a surface to be coated, or other surfaces.

In accordance with these principles, it is an object of the present invention to provide a process for synthesizing high-performance, engineered materials.

It is a further object of the present invention to provide a process for synthesizing ceramic materials.

Another object of the present invention is to synthesize strong, lightweight, environmentally resistant materials.

A further object of the present invention is to synthesize materials with a high degree of reliability.

Another object of the present invention is to synthesize material economically, in a process that is appropriate for commercial application and/or mass production techniques.

Yet, a further object of the invention is to provide a process and materials that meet high performance technical specifications, at a reasonable cost.

Another object of the present invention is to synthesize nano scale powders.

Another object of the present invention is to synthesize nano scale powders which have utility as catalysts to be used in the neutralization of hazardous or poisonous substances.

Another object of the present invention is to provide a method for synthesizing gradient coatings.

Another object of the present invention is to provide a method for synthesizing stream coatings.

Another object of the present invention is to provide a method for synthesizing uniform coatings.

An additional object of the present invention is to provide a simple, direct synthesis method, based on the use of pulse detonation technology which offers design and operational simplicity.

Another object of the present invention is to provide a material synthesis system based upon pulse detonation technology that offers significant performance advantages relative to other known methods of material synthesis.

A further object of the present invention is to provide a pulse detonation system that provides rapid material synthesis.

Yet, another object of the present invention is to provide a pulse detonation system that provides relatively high yield of final engineered product relative to the amount of raw material used in the process.

A further object of the present invention is to provide a relatively compact and simple device and process for synthesizing engineered materials.

It is yet a further object of the invention to provide an economical and flexible process for manufacturing ceramic powders and coatings.

The present invention achieves the objectives above by using a pulse detonation system. A reactant is added to the combustion chamber in the pulse detonation system and the reactant is modified and synthesized into the desired product in the detonation zone of the pulse detonation system. A further advantage of the present invention is that the material synthesized exits the pulse detonation system across away front and at relatively high velocity, which provides added advantages relative to application of the coatings and materials synthesized in the process.

It is to be understood that both the foregoing general description and the following detailed description are exemplary and explanatory only, and are not restrictive of the invention as claimed. The accompanying drawings, which are incorporated herein by reference, and constitute part of the specification, illustrate certain embodiments of the invention, and together with a detailed description, serve to explain the principles of the present invention.

BRIEF DESCRIPTION OF THE DRAWINGS

This application is a Continuation-in-Part of application Ser. No. 08/205,505, filed Mar. 4, 1994, and that prior application is incorporated herein by reference, in its entirety, as if fully set forth herein. The drawings of that prior application Ser. No. 08/205,505 relate to the pulse detonation apparatus that is used as part of the process of the present system. Those drawings are also incorporated herein by reference, as if fully set forth herein. The additional drawings of this application provide further refinement of the application of the pulse detonation system to the material synthesis process of the present invention.

DETAILED DESCRIPTION OF THE PREFERRED EMBODIMENTS

Figure 1:
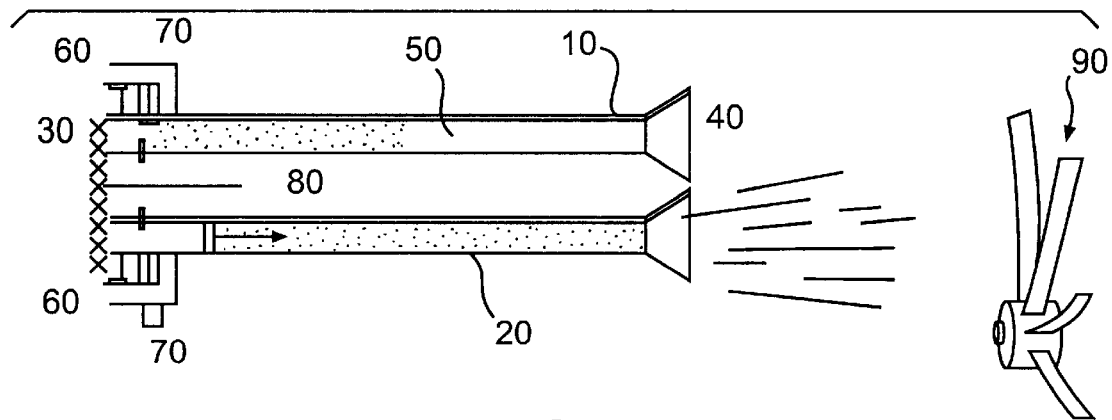
FIG. 1 is a simplified cross-sectional schematic of the pulse detonation synthesis device of the present invention being used to apply a thermal barrier coating to gas turbine blades.

Reference will now be made in detail to a preferred embodiment of the pulse detonation synthesis process of the present invention. The apparatus for accomplishing the pulse detonation synthesis process of the present invention is depicted in the accompanying drawings. A preferred embodiment of the present invention is shown in FIG. 1 as 10.

In a preferred embodiment, the pulse detonation synthesis apparatus and process of the present invention comprises one or more combustor tubes 20; material (reactant 62 and detonator mixture 64) reservoirs 60; valves 70; ignitor 80; and a workpiece or target 90 on which the material synthesized in the process is deposited. As embodied herein, each combustor tube 20 has a closed end 30 and open end 40 and a chamber 50.

As referenced in the prior Application of which this Application is a Continuation-In-Part, Ser. No. 08/205,505, a reactant 62 powder is mixed with the gases in the combustion chamber 50 to form a dust/gas suspension that is introduced into the detonation chamber 50. The detonation chamber 50 is designed to achieve a high degree of turbulence, to insure a well-mix suspension. For that reason, in one embodiment of the present invention, the pulse detonation synthesis device 10 of the present invention is oriented in a vertical position, as depicted in FIG. 30 of the co-pending application, to help prevent premature settling of the solid reactant prior to detonation.

Figure 13:
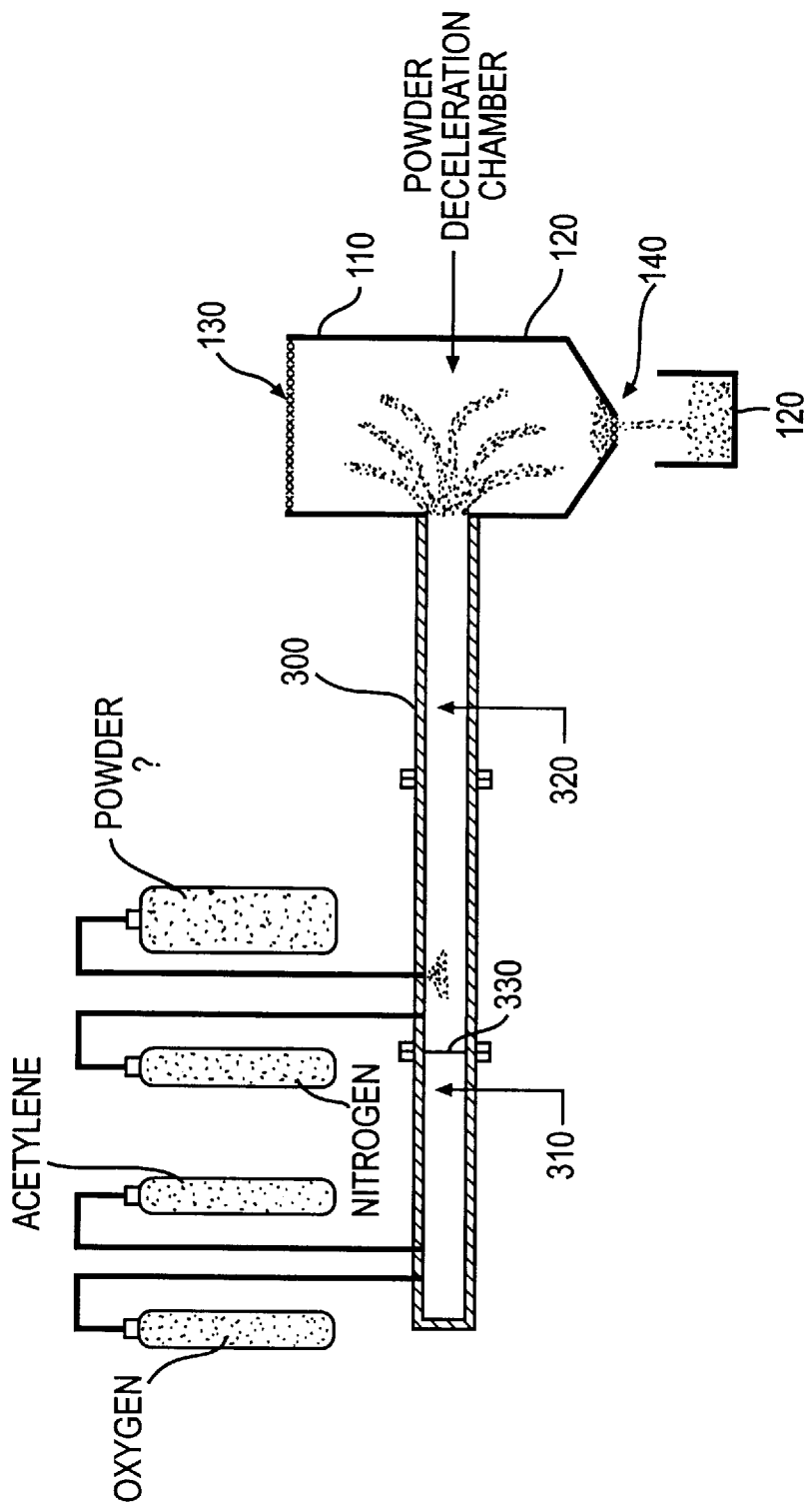
FIG. 13 is an idealized schematic of one embodiment of the invention further comprising a synthesized material collection system.
Figure 14:
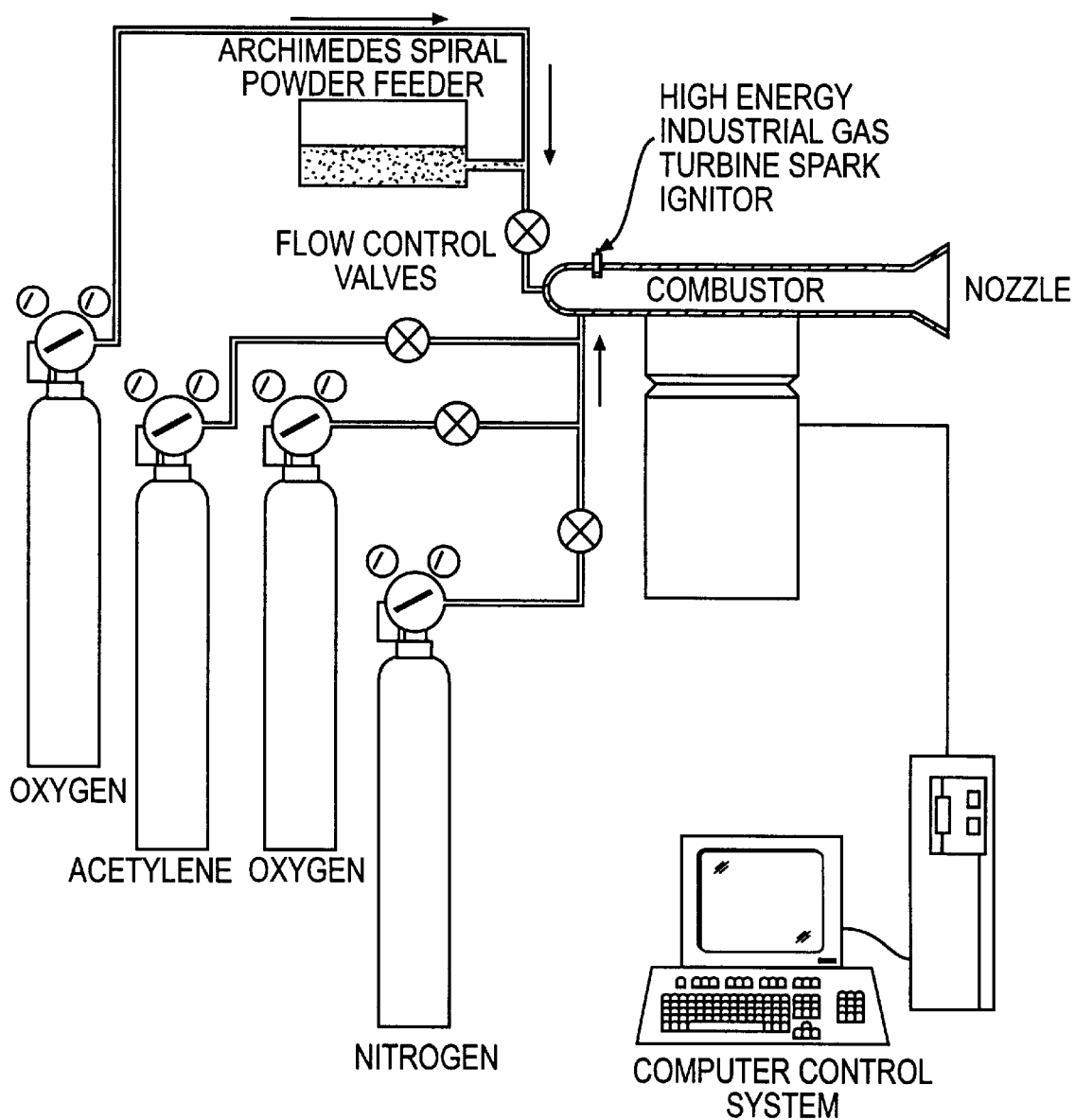
FIG. 14 is a schematic of a generic PDS device.

In one embodiment of the present invention, shown in FIG. 13, a pre-detonator tube 310 is filled with a highly detonable gas mixture (e.g. hydrogen/oxygen) which is ignited by high energy electrical spark discharge 80 of three to four Joules. A detonation wave 200 forms and travels toward the primary tube 320, ruptures an optional diaphragm 330 separating the pre-detonator 310 and primary 320 sections, and initiates detonation in dust/gas mixture. Combustion velocities and unsteady pressures in the dust/gas mixture are measured by a series of high speed pressure transducers 340 located along the length of the primary detonation tube 320. These measurements can be used to verify the combustion process occurring within the tube and determine whether they are stable, Chapman-Jouguet, or overdriven. As noted in the prior Application, the invention can also directly spray metal surfaces 90 with ceramic coatings.

Figure 1A:
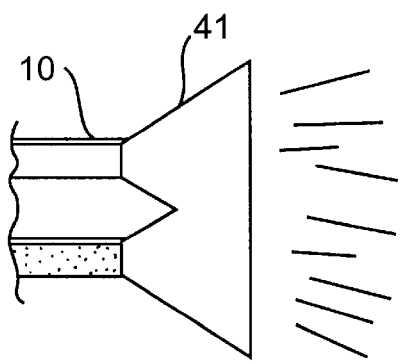
FIG. 1A shows the configuration of a multitube apparatus with a common nozzle.

FIG. 1A depicts an alternate embodiment in which multiple combustion tubes are connected to a common nozzle 41. As in the previously disclosed embodiment, the tubes 20 are aligned in substantially parallel configuration, but are connected to each other through a common nozzle 41. In this manner the exiting synthesized materials from each combustion chamber are mixed as they exit the apparatus. Depending the particular tube configuration and materials being combusted in any of the combustion chambers, this configuration may yield multi-phase coatings or mixtures. If, for example, each tube was configured so as to synthesize a different ceramic material, these materials could be mixed upon exiting the apparatus. In this manner, gradient coatings, stream coatings, or uniform coatings could be realized. Through various configurations of the apparatus, almost any desired commercial coating could be fabricated.

Figure 2:
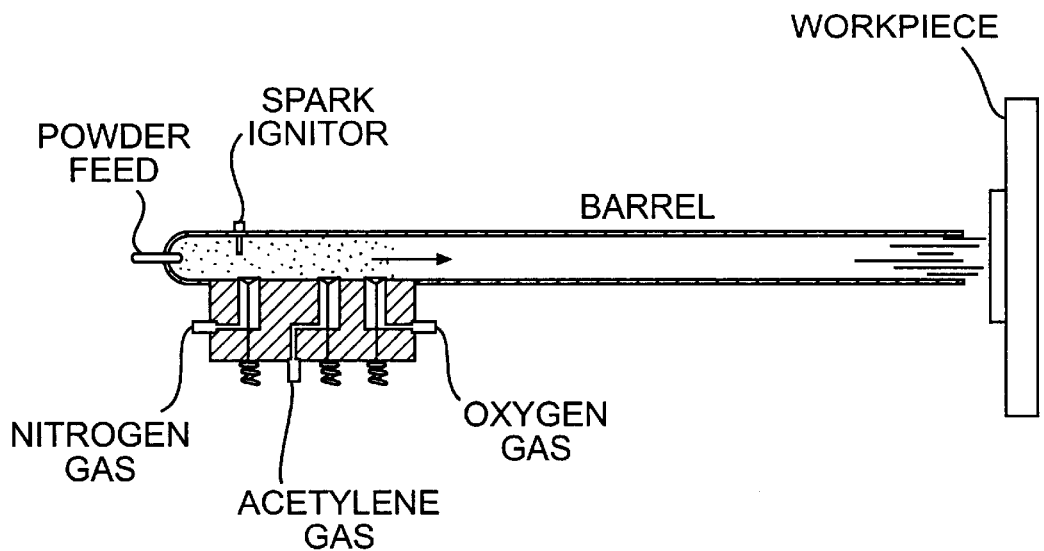
FIG. 2 is a cross-sectional sketch of a pulse detonation gun device known prior to the present invention.

FIG. 2 depicts a generic detonation gun of the type that was known prior to the present invention. Detonation guns use a detonation of a mixture of gaseous fuel and oxidizer to push and heat the precursor powders. Essentially, the material is fed to the closed end of the detonation gun of FIG. 2 in synthesized form. The detonation gun simply pushes and heats the material. Although pulse detonation synthesis has many features in common with detonation guns, the detonation wave in a pulse detonation synthesis device is used for more than merely transporting the ceramic powders. The innovation of the pulse detonation synthesis invention is that it can synthesize the coating material from the precursor powders and use the reaction to drive the products at higher velocities that are possible for techniques such as detonation gun spraying. Typically coating particles leave the detonation gun muzzle at approximately 760 meters per second. In contrast, a gas/dust detonation for a mixture of aluminum and oxygen in a pulse detonation synthesis process could produce detonation wave velocities at 1700 meters per second. Based upon the inventors' experience in thermal spray processes, higher velocities corresponding to the pulse detonation synthesis process could produce denser, better-bonded coatings.

The Pulse Detonation Synthesis process of the present invention can be applied to the synthesis of a wide range of ceramic materials. These include, oxides, nitrides, carbides, and other materials. The inventive process will yield both micron scale and nano scale powders. It will be apparent to those skilled in the art that various modifications and variations can be made in the apparatus, process, and product of the present invention, and in construction of the pulse detonation synthesis device 10 of the present invention, without departing from the scope or spirit of the invention. It is intended that the present invention cover these various modifications and variations, provided they come within the scope of the appended claims and their equivalents. Before describing in detail the preferred process of the present invention, it is important to understand the factors that make 2-phase detonation possible. The easier it is to detonate a given mixture, the simpler and less expensive the device of the present invention can be made. Several factors control the synthesis of the materials of the present invention: activation energy; heat of formation; initiation temperature; choice of reactants; initial thermodynamic state of the reactants; ceramic reaction paths; and alternate reaction paths.

Figure 3:
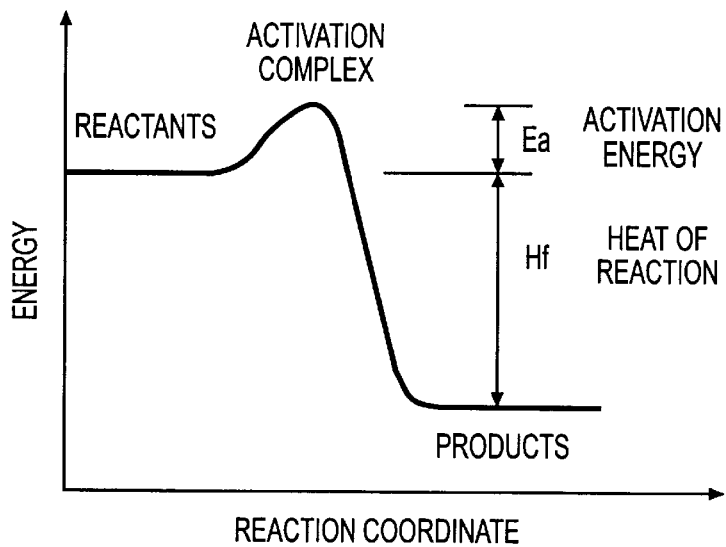
FIG. 3 is a graph of the idealized energy profile for the transformation of reactants to products of the present invention.

With respect to activation energy, FIG. 3 depicts an idealized energy profile for the transformation of reactants to products using the pulse detonation synthesis process of the present invention. The illustration of FIG. 3 is drawn from classical, elementary reaction theory. The figure illustrates the energy levels associated with the transformation of a group of reactants into products. In order for the reaction to proceed, the energy of the reactants must be increased by an amount equal to the activation energy. This energy must initially come from an external source. The magnitude of the activation energy is proportional to the reactivity of the reactants and is a measure of the ease of initiating a reaction in the mixture. Indirectly, it is a measure of the amount of energy required to initiate detonation in the mixture. Thus, the relative ease of initiating detonation in a given reactant mixture is proportional to the activation energy.

The reaction rate is found experimentally to be equal to:

$$k = Ae^{-Ea/RT}$$

where

A is the exponential factor, and

Ea is the activation energy.

Typically, A and Ea are obtained empirically from an experimental investigation of the variation of the rate constant, k, with temperature. Ea can also be approximated analytically using collision rate theory. Ea represents the activation energy for deflagrative reactions and can only be used as a rough guide for detonation initiation reactions.

The heat of formation plays a key role in determining whether a given reaction can develop into a self-sustained detonation. FIG. 3 also illustrate the concept of heat of formation. The magnitude and sign of the heat of formation provide a strong indication of how likely a detonation is to sustain itself, once initiated. A significant quantity of energy must be released to maintain a strong detonation wave. Further, the overall reaction must be exothermic, if a self-sustained detonation is to occur.

Ignition temperature might, absent empirical evidence, appear to be related to the energy required to initiate a detonation in a given reactant mixture. The prior literature, however, contradicts that idea. For example, TATB (Triaminotrinitrobenzene) and lead azide, both of which are high explosives, have approximately equal ignition temperatures (359° C.). Their detonation initiation requirements, however, are significantly different. TATB is an insensitive explosive. It requires large detonation initiation energy and high activation energy. Lead azide, on the other hand, is very sensitive explosive. It has low detonation energy and low activation energy. This apparent discrepancy can be explained by noting that the ignition temperature relates to the onset of deflagrative combustion, and not necessarily to detonation. Therefore, based on this example and others, it cannot be assumed generally that a low ignition temperature implies a low detonation initiation energy. All that can be said with confidence is that a lower ignition temperature tends to imply a lower detonation energy requirement. There are, however, several examples in the literature that contradict even this behavior. Adiabatic combustion temperature is a measure of the temperature required to sustain a reaction. If a given mixture has a high adiabatic combustion temperature and a low heat of combustion, it is likely difficult to detonate.

The choice of reactants is critical to the amount of energy required to initiate a detonation. Similarly, it is critical to the amount of energy necessary to sustain a stable detonation wave. The reactants must also meet the criteria for the possible ceramic reaction pathways. Table III illustrates some exemplary possible reactants and alternative reaction paths to produce the same end product.

The initial thermodynamic state of the reactants can also effect the ease with which a given reactant mixture can undergo detonation. For example, a high initial pressure and temperature can effectively reduce the amount of energy required to initiate detonation. The heat of combustion, however, also needs to be sufficient in order to sustain the detonation.

Possible ceramic reaction paths must be considered. In a preferred embodiment of the present invention, three particular reaction paths (oxide, nitride, and carbide) are of particular interest. The heats for formation for each reaction path are defined by the following equation:

$$\Delta Hf = Hf_{products} - Hf_{Reactant}$$

where Hf is the heat of formation. Barrows (1973). Using specific heat values obtained from Weast (1976), listed below are some of the preferred possible reaction paths and their corresponding heats of formation:

TABLE III

Possible Reactions

Possible Oxide Reactions

| | |
|---|---|
| $2Al + 3/2\ O_2 \longleftrightarrow Al_2O_3$ | $\Delta Hf = -1670$ KJ/Mole |
| $Mg + 1/2\ O_2 \longleftrightarrow MgO$ | $\Delta Hf = -612$ KJ/Mole |
| $Zr + 1/2\ O_2 \longleftrightarrow ZrO_2$ | $\Delta Hf = -1080$ KJ/Mole |

Possible Nitride Reactions

| | |
|---|---|
| $Al + 1/2\ N_2 \longleftrightarrow AlN$ | $\Delta Hf = -238$ KJ/Mole |
| $B + 1/2\ N_2 \longleftrightarrow BN$ | $\Delta Hf = -134$ KJ/Mole |
| $Ti + 1/2\ N_2\ TiN$ | $\Delta Hf = -305$ KJ/Mole |

Possisble Carbide Reactions

| | |
|---|---|
| $Ti + C \longleftrightarrow TiC$ | $\Delta Hf = -226$ KJ/Mole |
| $Si + C \longleftrightarrow SiC$ | $\Delta Hf = -112$ KJ/Mole |

An alternate preferred embodiment would be the production of silicon nitride ($Si_3N_4$). In this case silane and ammonia would be used as the reactants to generate the desired end product.

Alternate reaction paths must also be considered in identifying appropriate variations and modifications of the present invention. Based upon experimental data available in the literature, certain combinations of compounds appear detonable. These include the aluminum oxide reaction and, by extrapolation, the magnesium and zirconium oxide reactions. Detonation of the nitride and carbide reactions do not appear to occur directly. This is primarily due to the low heats of formation of the reaction paths identified in Table III and the high ignition temperatures required to initiate combustion.

Several methods have been developed to enhance the possibility of detonation of certain reactive mixtures. These include adding additional materials which can act to sensitize the mixture and maintain a stable detonation. Another approach is to add another material which acts as an intermediate in the reaction path. The first method involves adding another material which reacts with one of the primary reactants. For the oxide reactions, the additive could be hydrogen or any highly detonable hydrocarbon, such as acetylene. An example of such a reaction for the production of zirconium oxide with hydrogen is:

$$Zr+3/2O_2+H_2 \leftrightarrows ZrO_2+H_2O$$

while the same oxide reaction with acetylene would be:

$$Zr+7/2O_2+C_2H_2 \leftrightarrows ZrO_2+H_2+2CO_2$$

The specific reaction characteristics must be assessed, either numerically or experimentally. Some add mixtures, such as $H_2/O_2$ and $C_2H_2/O_2$ mixtures have very low energy requirements. These can be used to help detonate otherwise insensitive mixtures. It is also possible, as part of the present invention, to add two different materials which detonate but do not chemically react with the primary reactants. The additional materials serve to provide the temperature and pressure conditions necessary to initiate detonation of the primary mixture. For example, $H_2/O_2$ could be used for this purpose. Note that it is critical to match the Chapman-Jouguet wave speeds of the different detonation processes to ensure that a stable detonation is established with the principle reactants.

The above example, using acetylene as an additive should be construed as illustrative only. Applicants do not wish to be limited to acetylene as an additive as any other detonable hydrocarbon that will perform the desired functions may be included.

The second approach involves the use of an intermediate to: reduce the reaction ignition temperature; increase the effective heat of formation of the reaction; or replace expensive starting materials with less expensive starting materials. For example, a thermite-type reaction for the synthesis of $B_4C$ could be employed:

$$2B_2O_3+6Mg+C \leftrightarrows B_4C+6MgO$$

These cases are intended to represent only some of the possible alternate reaction paths. Numerous possibilities exist for the production of carbides and nitrides. Although oxide reactions, in general, are preferred because they have very high heat of combustion values and are usually self-sustaining in the detonation mode, it is intended that the present invention cover all the modifications and variations of the invention, provided they come within the scope of the appended claims and their equivalents.

As disclosed in the prior co-pending applications, pulse detonation is a combustion process characterized by the propagation of a shock wave 210, followed by a closely coupled reaction zone 220. Under certain circumstances, the close coupling can lead to detonation. Detonation is a supersonic combustion wave that typically propagates at a few thousand meters per second relative to an unburned fuel/oxidizer mixture. Detonation is much more energetic than deflagrative combustion and produces substantial overpressures. A detonation wave compresses a fluid, increasing its pressure and density, in addition to increasing its temperature. Detonations can be approximated as supersonic shock waves that initiate and are closely coupled to a thin flame front 220 or combustion region. Due to the high speed of a detonation wave, detonation closely approximates a constant volume combustion process.

Figure 4:
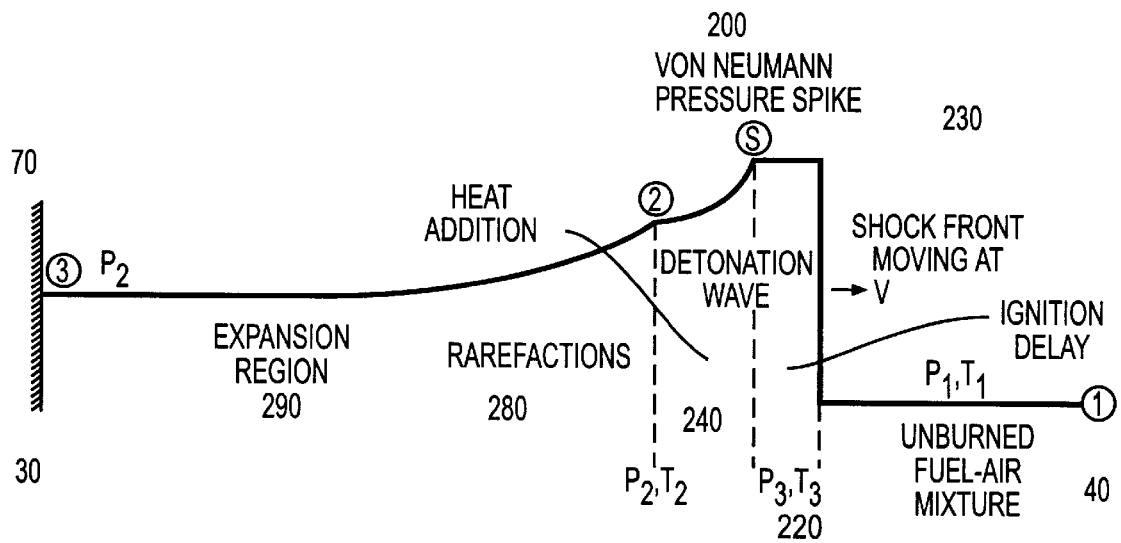
FIG. 4 is an idealized, systematic detonation chamber pressure profile of an embodiment of the present invention.

FIG. 4 depicts the pressure distribution within a detonation chamber 50 with one end closed 30 and one end open 40. As shown in FIG. 4, detonation has been initiated at the closed end 30 of the combustor tube 20 and is propagating toward the open end 40. In a preferred embodiment of the present invention, the valved 70 end of the combustor tube 20 is closed 30 during detonation. It will be apparent to those skilled in the art that various modifications and variations can be made in closing or opening the ends 30 and 40 of the combustor tube 20 of the present invention, without departing from the scope or spirit of the invention. For example, the valves 70 may be open. Further, the end that is closed in a preferred embodiment of the present invention 30 may also be open. Further, an optional membrane 330 can be disposed between a pre-ignition 310 and primary 320 section of the combustion chamber 50, as shown in FIG. 13. These options also include initiation detonation at the open end 40 of the combustor tube 20 having one end closed 30 and detonating the tube with two open ends, namely, a valveless design. It is intended that the present invention cover the modifications and variations of the invention, provided they come within the scope of the appended claims and their equivalents.

The detonation wave 200 of the present invention can be modelled as a strong shock wave 210 which triggers combustion and a thin flame front 220 in which heat addition occurs, just behind the shock front. The shock front 210 moves at a detonation velocity, $V_{Detonation}$, relative to the gas and increases the pressure and temperature of the gas from its previous values of $P_1$ and $T_1$. The region of unburned gas just behind the shock is a stable high pressure region 230 known as the von Neumann spike. This region represents the ignition delay. Its thickness is dictated by the chemical kinetics of the detonation. The duration of the spike 230 with respect to a fixed point is very short, on the order of one microsecond.

Once the chemical reaction kinetics are initiated, heat is added to the flow 240. As a result, the temperature increases and the pressure decreases. The thickness of the heat addition region 240 is determined by the time required to complete the combustion reaction. At that point, the burned gas 280 is in State 2. In accordance with a detonative process, the temperature, pressure, and density at State 2 are significantly greater than at State 1.

The pressure and density in the stable detonation wave $(P_2,\rho_2)$ are significantly lower than in the von Neumann region 230 between the shock front 210 and the chemical reaction zone 270. The detonation wave temperature $(T_2)$ just after the flame region 220 is significantly higher than in the von Neumann spike 230.

In closed tube detonations, an expansion region 290 exists behind the heat addition region 240. Rarefaction waves 250 emanate from the closed end 30 in order to ensure that the normal velocity at the wall is zero. As a result of the expansion, most of the burned gas in the detonation tube is at a pressure, $P_3$, which is significantly lower than the pressure just behind the detonation wave 200 ($P_2$).

Figure 5:
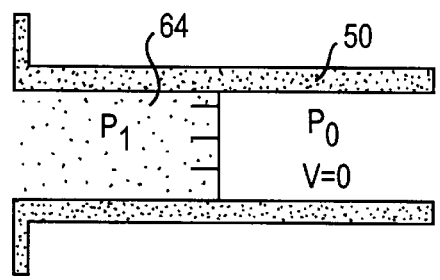
FIG. 5 is a schematic, cross-sectional diagram showing the filling of the combustor of the present invention by a detonable mixture.
Figure 6A:
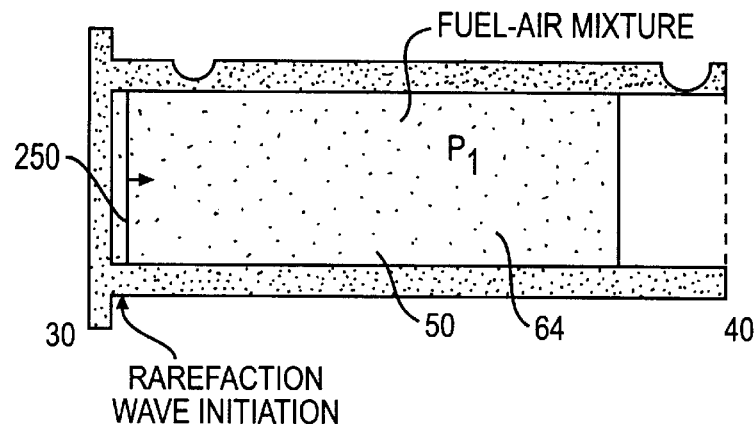
FIG. 6 is a series of cross-sectional drawings depicting the initiation, propagation, and discharge of the detonation process of the present invention.
Figure 6B:
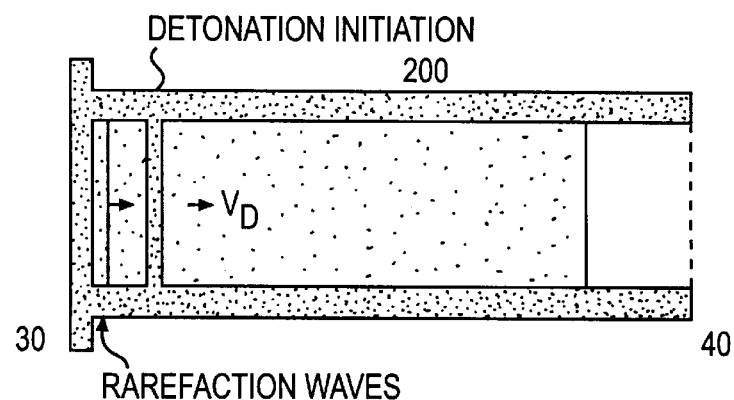
Figure 6C:
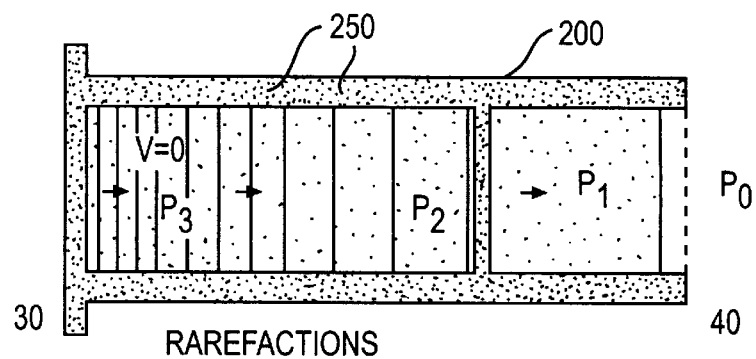
Figure 6D:
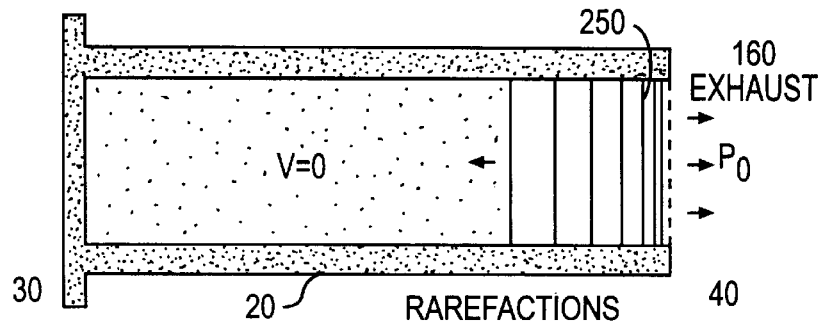
Figure 7:
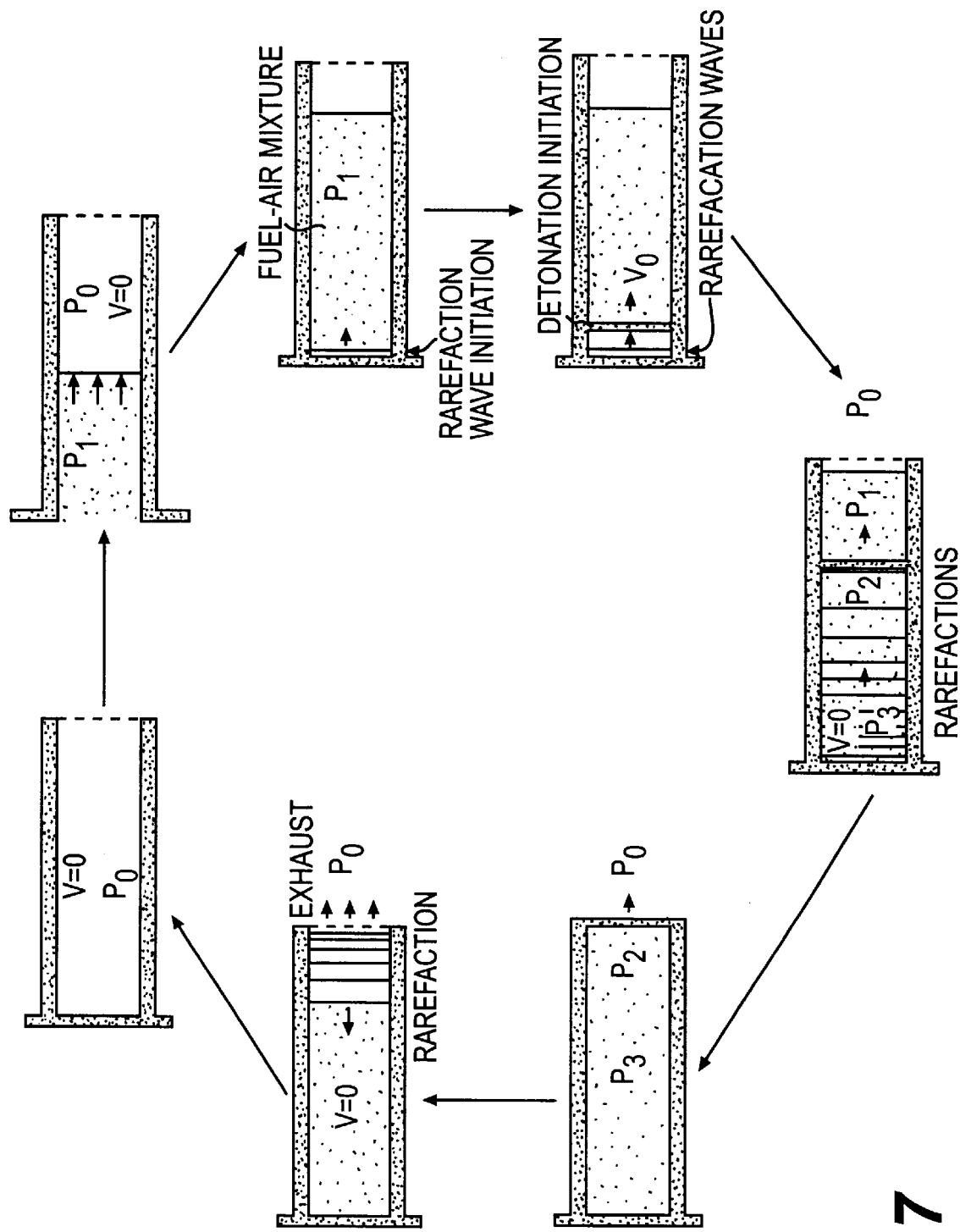
FIG. 7 is a diagram depicting a summary of the detonation cycle of the pulse detonation synthesis process of the present invention.

The pulse detonation synthesis cycle of the present invention is depicted in FIGS. 5, 6, and 7. The pulse detonation synthesis process of the present invention is preferably conducted in several discrete steps:

1. A detonation combustion chamber is filled with reactants to be combusted and an easily detonable mixture (the easily detonable mixture is referred to as the "initiation mixture");
2. Detonation is initiated at the closed end 30 of the combustor 20 within the initiation mixture;
3. The detonation wave 200 propagates through the initiation mixture into the reactant mixture and exits at the open end to either a collection container or target area 90; and 4. The burned gases in the combustor 20 exhaust through a blowdown process.

When the conditions within the combustor 20 reach a specified state, the combustor 20 is recharged with a fresh detonable mixture, and the cycle is repeated. This process is depicted through one complete cycle in FIG. 7*a–g*.

As shown in FIG. 5, valve 70 opens to start the detonation synthesis cycle. A fuel/oxidizer mixture 64 is admitted into the combustion chamber 50 at the conditions determined by the desired final synthesis or coating properties. The pressure and temperature of the fuel/oxidizer mixture 64 entering the combustor are $P_1$ and $T_1$, corresponding to State 1, as shown in FIG. 5.

As shown in FIG. 6, after the fuel/oxidizer mixture 64 enters the chamber 50, a valve 70 at the end 30 of the combustion chamber 50 is closed in preparation for detonation initiation. The valve 70 seals the combustor 50 when the downstream 40 fuel/oxidizer mixture 64 is still at some finite distance from the end of the chamber 40. The valve timing ensures that the fuel/oxidizer mixture 64 and the detonation wave 200 reach the combustor exit 40 simultaneously. This prevents any of the unburned mixture from escaping. As illustrated in FIG. 6*a*, the degree to which the detonation tube is filled with fuel/oxidizer 64 is calculated from the overall length of the tube and the relative velocities of the injected fuel/oxidizer mixture 64 and detonation wave 200.

After valve 70 is closed, a detonation wave 200 is initiated immediately in the fuel/oxidizer mixture 64 near the closed end 30 of the chamber 50, as shown in FIG. 6*b*. An expansion zone 290 is created between the closed end 30 and the detonation wave 200. Rarefaction waves 250 are generated at the closed end 30 of the detonation chamber 50 and proceed toward the exit 40 as shown in FIG. 6*b*. The rarefactions 250 originate at the closed end 30 and satisfy the constraint of zero axial fluid velocity normal to the wall. The strength of the expansion region 290 is a function of the axial velocity of the burned gases behind the detonation wave 200 which must be decelerated to satisfy the closed end boundary condition.

Two factors contribute to the axial velocity of the synthesized material: (1) the initial velocity of the injected fuel/oxidizer mixture 64, and (2) the velocity imparted to the synthesized material and burned fuel/oxidizer mixture 160 by the detonation wave 200. Both components of axial velocity are directed toward the open end 40 of the detonation chamber 50. The detonation wave 200 moves away from the synthesized material 150 and burned gases 160 at the local speed of sound (Chapman-Jouguet condition). However, both the detonation wave 200, and the synthesized material 150 and burned gas 160, move in the direction of the exit 40.

Ideally, a detonation wave 200 will proceed toward the open end of the chamber 40 at the Chapman-Jouguet detonation velocity, "VD", of the mixture. The region ahead of the detonation will contain unburned gas 230 at State 1 260. Just behind the detonation wave 200, the synthesized material 150 and burned gas 160 will be at significantly higher temperature and pressure (State 2 265). The synthesized material 150 and burned gas 160 near the closed end of the detonation tube 30 will be at State 3 264 which has a lower temperature and pressure than the synthesized material 150 and burned gas 160 immediately behind the detonation (State 2 262). This is due to the expansion region 290, generated behind the detonation wave 200. As shown in FIG. 6*c*, the remainder of the synthesized material 150 and burned gas 160, within the expansion region 190 between the detonation wave 200 and the closed end 40, will be at some intermediate condition between State 2 262 and State 3 264.

When the detonation wave 200 exits the combustor 50, the chamber 50 contains synthesized material 150 and burned gas 160 (i.e., combustion products) at elevated temperatures and pressures. Conditions along the length of the chamber 50 range from State 3 264 at the closed end 30 to State 2 262 at the open end 40. The pressure in the combustion chamber 50 increases from $P_3$ at the closed end 30 to $P_2$ at the open end 40. The axial velocity distribution varies accordingly from zero at the closed end 30, to potentially supersonic values near the exit 40.

As the detonation wave 200 exits the combustor 50, a pressure differential exists at the open end 40. As shown in FIG. 6*d*, this pressure differential creates a series of rarefaction waves 250 which propagate into the tube, in the direction of the closed end 30 and expel the synthesized material 150 and burned gas 160 from the combustion chamber 50. This effect is depicted in FIG. 6*d*. The rarefaction waves 250 travel into the tube at the speed of sound of the combustor gas mixture. Initially, as the detonation wave 200 exits the detonation tube 20, the gas within most of the tube is at a pressure near $P_3$ and the velocity is nearly zero. An expansion process then accelerates the fluid toward the exit.

As the gas in the detonation chamber 50 expands, as shown in FIG. 6*d*, the driving pressure differential along the chamber 50 diminishes. The unsteady blowdown process is characterized by a series of compression and rarefaction waves 250 which are alternately created and reflected. The blowdown process is preferably self-aspirating. The flow field at the combustor exit 40 alternates between outflow and inflow (i.e., reverse flow). The pressure and temperature eventually decay to ambient levels and the exhaust velocity eventually decays to zero. This process is also depicted in FIG. 7. The detonation cycle can be repeated when the pressure within the chamber falls below a specified injection pressure. At this point in the cycle, the combustion chamber 50 can be filled with a fresh fuel/oxidizer mixture 64 and the previously described detonation cycle can be restarted. FIG. 7 shows the sequence of events and phenomena that occur within the detonation tube 20 over an entire detonation cycle.

It will be apparent to those skilled in the art that various modifications and variations can be made in the preferred detonation cycle of the present invention, without departing from the scope or the spirit of the invention. For example, several detonation process configurations are possible, depending on the conditions required to initiate detonation. By means of example and by no means to limit the present invention, three possible configurations include single-stage detonation initiation, multi-stage detonation initiation, and micro-stage detonation initiation. The single-stage detonation initiation embodiment of the present invention is shown in FIG. 8*a*.

Figure 8A:
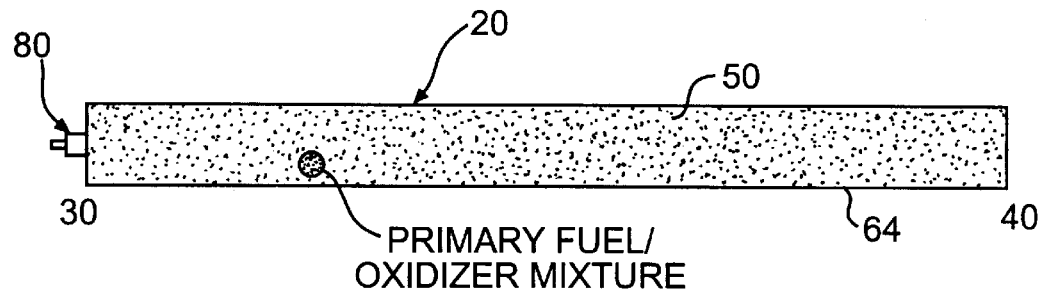
FIG. 8 is a series of cross-sectional sketches showing single stage (FIG. 8a), multi-stage (FIG. 8b) and micro-stage (FIG. 8c) embodiments of the pulse detonation synthesis process of the present invention.

In the embodiment of the invention illustrated in FIG. 8*a*, single-stage detonation initiation is possible if the fuel/oxidizer mixture 64 is easily detonable and can be initiated with a weak electrical discharge 80. Examples of highly detonable mixtures include hydrogen/oxygen, acetylene/oxygen, and propane/oxygen. The single-stage detonation initiation embodiment of the invention is considered appropriate for oxide reactions. In general, the single-stage detonation initiation embodiment might not be sufficient to initiate stable detonation in nitride or carbide synthesis processes of the present invention. In these cases, the multi-stage or micro-stage detonation initiation embodiments are preferred.

Figure 8B:
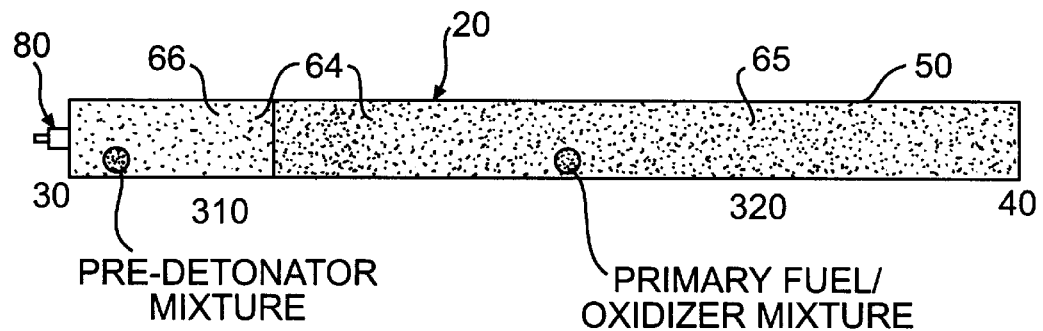

Multi-stage detonation initiation embodiment of the present invention is depicted in FIG. 8b. The multi-stage detonation initiation embodiment of the present invention has proved extremely effective in initiation detonation in fuel/oxidizer mixtures 64 having large detonation initiation energies. For example, the multi-stage detonation initiation embodiment of the present invention is preferred for essentially all fuel/oxidizer mixtures and some fuel/oxygen mixtures. In this embodiment of the present invention, the detonable mixture 64 comprises a first stage, pre-detonator mixture 66 and a primary stage fuel/oxidizer mixture 65. In this embodiment of the invention, the pre-detonator mixture 66 comprises a highly detonable fuel/oxidizer mixture which can easily be ignited by a weak electrical discharge 80. The fuel and/or oxidizer can be different from the materials to be detonated in the primary mixture 65. Alternatively, one or both of them can be the same. The essential condition for successful detonation initiation of the primary mixture is the strength of the shock wave exiting the pre-detonation mixture 65 portion of the combustion chamber 50. Care must be taken, therefore, to correctly match the pre-detonator and primary stages of the combustion chamber 50.

Figure 8C:
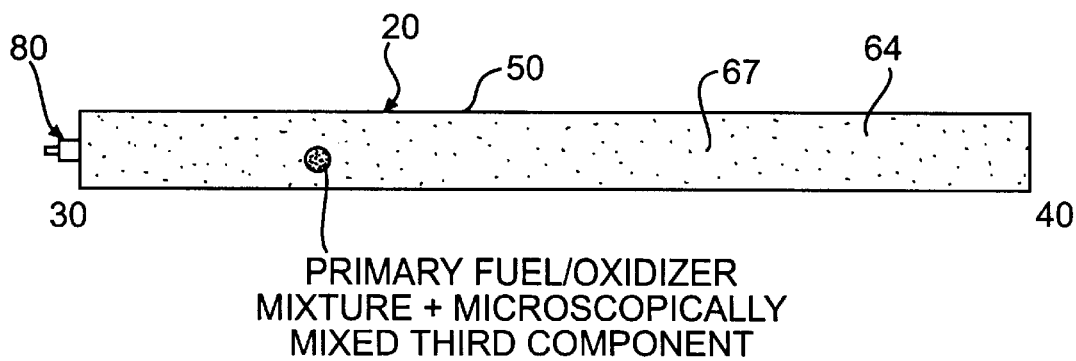

FIG. 8c depicts the micro-stage detonation initiation embodiment of the present invention. In the micro-stage detonation embodiment, a third component 67 is added to the detonable mixture 64 to enhance or sensitize the mixture 64. The specifics of this concept were discussed previously in this specification with respect to alternate reaction paths.

In addition to these variations and modifications, it will be apparent to those skilled in the art not only that alternate initiation embodiments could be used, but also that combinations of these as well as other initiation embodiments are also possible. Thus, it is intended that the present invention cover the modifications and variations of the invention, provided them come within the scope of the appended claims and their equivalents. Particularly, it should be noted that Applicants do not intend to be limited to the particular oxidizers or hydrocarbons cited herein. It will be apparent to those skilled in the art to use other standard oxidizers and/or hydrocarbon fuels that will result in the detonation synthesis of the instant invention. FIGS. 9 and 10 depict various detonation modes that are considered to be part of the present invention. The mode of detonation can be related to the composition of the reactant 62 and detonable 64 mixtures that are used in the invention.

Figure 9A:
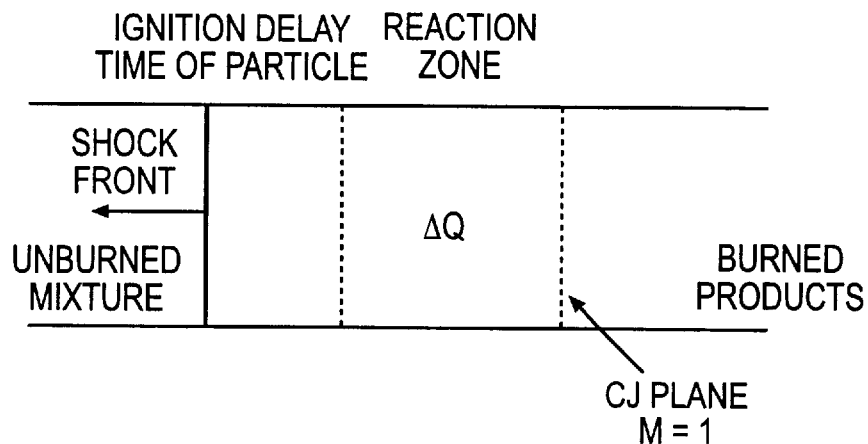
FIG. 9 is two schematic diagrams showing an idealized Single Front detonation structure of a particle/oxidizer suspension (FIG. 9a) and an idealized sketch showing the interaction of a spherical particle with a shock front (FIG. 9b).
Figure 9B:
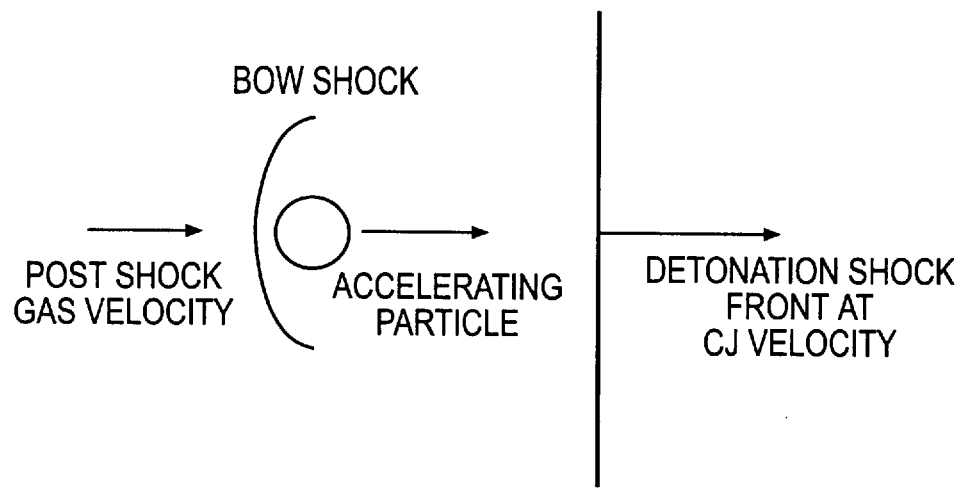

For example, FIG. 9a depicts an idealized Single Front detonation structure. This detonation structure will typically obtain with respect to solid particle suspensions of uniform size in an oxidizer, such as aluminum in oxygen. In this combination, only a single mode of detonation can occur, Single Front detonation. The structure of a Single Front detonation wave 200 is analogous to a gaseous/gaseous detonation front as depicted in FIG. 9a. Detonation waves 200 having this structure travel at the Chapman-Jouguet detonation speed for the particular combustion mechanism of interest. Substantially study has been devoted by others, prior to the present invention, to the study of shock induced initiation of particles. For example, Wolanski (1993), Fox (1977), and Boiko (1987) have all studied the basic mechanism of heat flow interaction. FIG. 9b depicts this basic mechanism of the interaction of a spherical particle with the shock front 210. As depicted in FIG. 9b, a particle initially at rest is subjected to a supersonic flow due to passage of the detonation wave 200 which causes a bow shock 210 to form. The flow nearly stagnates between the particle and the bow shock 210 resulting in high gas temperatures that rapidly heat the particle. Drag force has simultaneously caused the particle to accelerate in the direction of the shock wave 210, effectively reducing the gas temperature at the particle's surface. Large particles take longer to accelerate to the gas velocity. They are subjected to longer times at the initial high temperature.

Other researchers have identified that smaller particles are more easier ignitible, Khasainov and Veyssiere (1993), and detonable than large particles. In addition, flaked particles, possessing large surface area to mass ratios, have also shown to be more ignitible than spherical or ellipsoid particles of the same mass. (The ignitibility of flaked particles, however, depends on whether they are oriented, parallel or perpendicular to the flow.) Tulis and Selman (1982) have reported that surface area to mass ratio is the critical parameter for measuring shock-initiated ignitibility. The present inventors, based upon this prior work and the work that lead to the present invention, have thus concluded that small surface area to mass ratio particles (namely, small spheres or larger flakes) will yield the most energetic ignition and detonation phenomenon for pulse detonation synthesis and deposition. Nonetheless, they do so at an increased cost for materials. Ignition delay time must also be considered. For some types of particles, such as aluminum oxide ($Al_2O_3$) this can be a severe requirement. Historically, the Friedman-Macek criterion stated that the metal particle would ignite only after the particle's surface has reached the melting point of the exterior oxide layer, which for $Al_2O_3$ is 2310K.

Veyssiere and Khasainov (1991) have proposed much less stringent initiation temperature criteria. Based on these criteria, the temperature of ignition will fall somewhere between the melting temperature of the oxide film and the metal. While a generalized formulation for all metal/metal oxide systems is not available, the inventors believe that the ignition temperatures for the embodiments of the present invention should lead to an ignition temperature somewhere between the oxide and metal melting points.

Frictional losses should also be considered. The effects of momentum and heat transfer loss due to wall friction have been shown to be much more important to the structure of solid/gaseous detonations than to gaseous/gaseous detonations. This is because solid particles tend to interact more readily with the walls in confined environments (i.e., narrow tubes) that have rough surfaces.

Figure 10A:
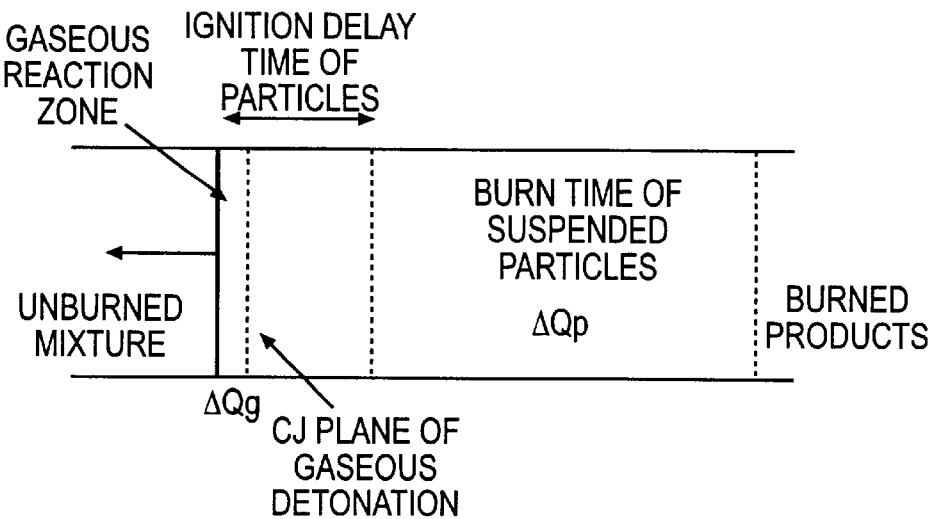
FIG. 10 is a series of sketches depicting a Pseudo-Gas detonation, solid particle/gaseous fuel and oxidizer (FIG. 10a), a Double Front detonation, solid particle/gaseous fuel and oxidizer (FIG. 10b), and Single Front detonation, solid particle/gaseous fuel and oxidizer (FIG. 10c) suspension embodiments of the pulse detonation synthesis apparatus of the present invention.
Figure 10B:
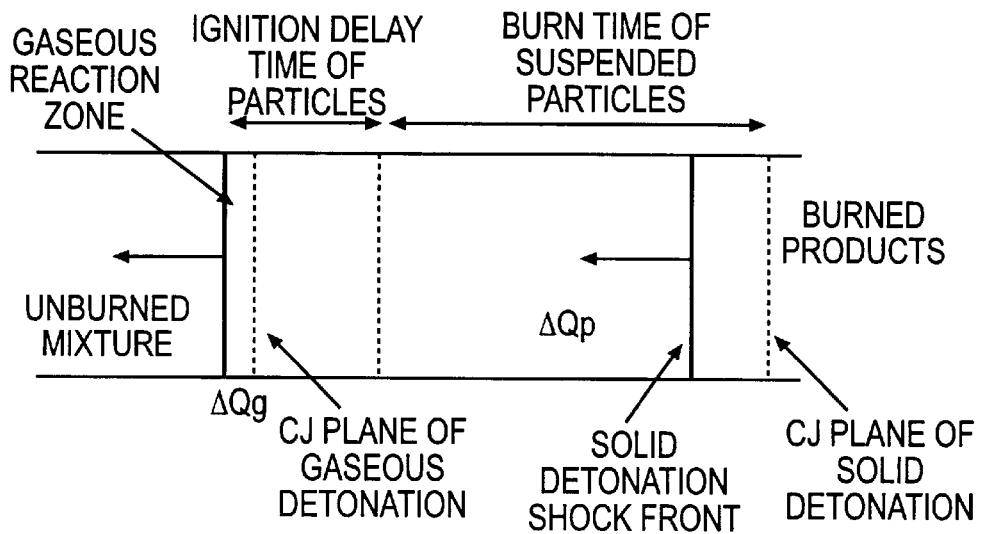
Figure 10C:
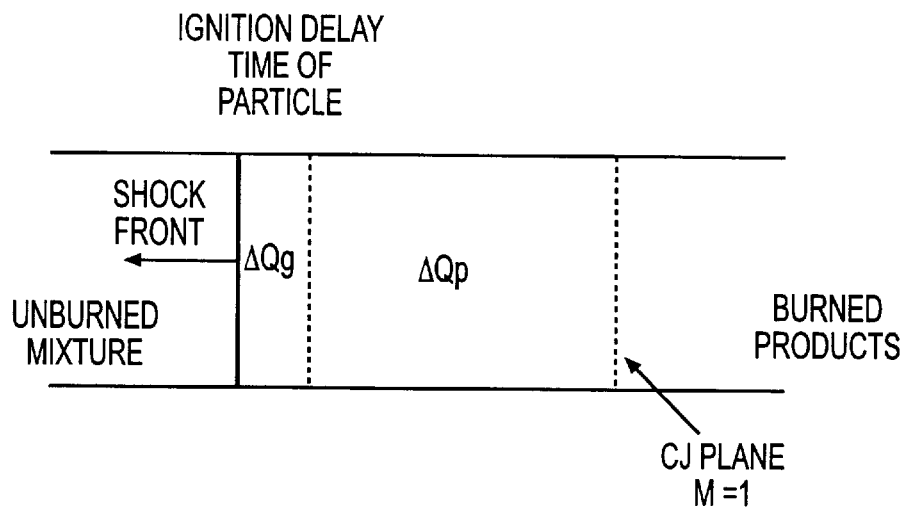

Upon consideration of these various factors, the inventors have identified three basic detonation regimes pertinent to the present invention. Intensive effort has gone to the study of solid fuel/gaseous fuel/gaseous oxidizer detonation structures. Khasainov and Veyssiere (1993). Suspensions of particles (namely aluminum) and mixtures of hydrogen, acetylene, and ethylene in air and oxygen have been shown to support three different forms of detonation: Pseudo-Gas detonation; Double Front detonation; and Single Front detonation. These are depicted in FIGS. 10a–c. Certain examples are listed below. They are intended to be illustrative only and not limiting on the scope of the invention.

In the Pseudo-Gas detonation embodiment of the present invention, the leading detonation wave 200 travels at a velocity that is approximately five percent less than the pure Chapman-Jouguet velocity of a gaseous fuel/oxidizer system. FIG. 10a depicts, in stylized schematic form, a Pseudo-Gas detonation embodiment of the present invention in an initiation mixture 65 that comprises a suspension of solid particles 62 in a gaseous fuel and oxidizer detonable mixture 64. As shown in FIG. 10a, the suspended solid reactant particles burn downstream of the Chapman-Jouguet plane 220 in deflagrative combustion. This combustion is characterized by the relative particle ignition delay time and particle combustion time depicted in FIG. 10a. The Chapman-Jouguet detonation front 220 experiences no contribution due to the particle burning, and the particles act as an inert substance that tend to draw energy away from the gaseous detonation front 220. Pseudo-Gas detonation is, therefore, the least energetic of the three detonation regimes depicted in FIG. 10.

FIG. 10b depicts a second type of detonation regime of the present invention, namely, Double Front detonation. The Double Front mode of detonation depicted in FIG. 10b is also appropriate for use in initiation mixtures 65 of the present invention that comprise solid particle reactants 62 suspended in a gaseous fuel and oxidizer detonable mixture 64. The Double Front detonation regime depicted in FIG. 10b is characterized by a leading gaseous detonation wave that travels at the gaseous Chapman-Jouguet detonation wave velocity 220 as shown in FIG. 10b. A secondary Chapman-Jouguet detonation wave follows the first after a constant time delay. The second front is supported by the combustion of the solid reactant particles 62 with the products and remaining oxidizer of the first detonation wave.

FIG. 10c depicts a detonation regiment of Single Front detonation. The regiment depicted in FIG. 10c is the most energetic detonation structure of those observed by the present inventors and depicted in FIG. 10c. The Single Front detonation embodiment of the present invention depicted in FIG. 10c is characterized by a single Chapman-Jouguet detonation wave 200 but is supported by both gaseous and solid particle combustion. The detonation wave of a Single Front detonation depicted in FIG. 10c is the most energetic of the three types of detonations depicted in FIG. 10.

It will be apparent to those skilled in the art that various modifications and variations can be made in the detonation regime of the present invention, without departing from the scope or spirit of the invention. For example, the occurrence and steady propagation of Pseudo-Gas detonation, Double Front detonation, or Single Front detonation for any specific embodiment of the present invention is governed by a complex set of factors, including: particle diameter, concentration, tube diameter, and tube roughness. A typical map of the regimes of stable propagation for an $Al/H_2/air$ mixture is shown in FIG. 11.

In general, the present inventors have found that, as the size of the reactant particle 62 decreases and the tube diameter of the combustion chamber 50 increases, the domain of Single Front detonation increases relative to Pseudo-Gas detonation and Double Front detonation. This is because of the larger surface are/mass ratio of the reactant particles, which allows quicker combustion. This is also due to the phenomenon that the heat release rate is accelerated in wider tubes for the same reactant particle concentration. For larger particles or smaller tubes, Pseudo-Gas detonation may become the dominant mode of detonation propagation. This is because particle combustion may take longer and wall losses may be more directly felt by the flow. Double Front detonation may be observed only for particle concentrations below the quenching limit of the inert reactant particles 64. Double Front detonation, therefore, is replaced by Single Front detonation when the level of losses decreases sufficiently. When the losses become excessive, Double Front detonation is replaced by Pseudo-Gas detonation regimes. As particle concentration of the reactant particle 62 increases, the energy content of all three detonation structures is reduced, and Single Front detonation becomes the more prevalent mode of detonation.

The implication of these phenomenon on the synthesis and deposition of ceramics materials is important. It may become necessary to use a sensitizing fuel or driver for Pulse Detonation Synthesis of certain materials. The initiation and propagation of stable Single Front detonation ways would produce the most energetic products and provide the most efficient combustion. This may be critical to the overall efficiency of the Pulse Detonation Synthesis process. Construction of graphs similar to those shown in FIG. 11 for the mixture/suspension of interest ensures that the proper conditions are obtained for optimal synthesis of the desired final product.

In addition, numerous models of solid/gaseous ignition and detonation processes have been developed prior to the present invention. These are primarily in the area of studying fuel/oxidizer explosives, industrial accidents (coal, grain, metal dust, etc.), and solid propellant combustion. The sophistication of the literature has improved dramatically in the last five years. The most sophisticated algorithm was published by Khasainov and Veyssiere (1993). Their model allows the prediction of Pseudo-Gas detonation, Double Front detonation, and Single Front detonation regimes, ignition delay times, and detonation characteristics for solid particle/gaseous detonations, with and without fuel additives. The incompressible conservation equations for mass, momentum, energy, and number of particles are solved simultaneously with the gas phase mass, momentum, and energy equations. The reactions between the particles and gases are modelled by heat and momentum exchange equations. The effects of particle size, concentration, tube diameter, and surface roughness may be explored. Good matches have been obtained by the present inventors with experimental data available for aluminum detonation. Another model, Lee and Sichel (1986), that has been used primarily for organic dusts (wheat, oats) was also able to accurately model the present inventors experimental results. The governing differently equations of the two-phase mixture (conservation of mass, momentum, and energy, heat transfer between the gas and solid particles, and the particle trajectory) are integrated from an initial condition just after the leading shock. Many older models for shock induced initiation delay time of particles exits, but none exhibit the refinement of these models.

The present inventors have found that there are hundreds of different types of ceramics that can be synthesized using the present invention. The ceramics of the present invention could be used in a wide variety of defense, industrial, and commercial applications. By means of example, and not in any way by means of limiting the present invention, the inventors have conducted numerous experiments with various oxides, carbides, and nitrides in the Pulse Detonation Synthesis process of the present invention. It will be apparent to those skilled in the art that various modifications and variations can be made in not only the reactant materials but also the final products resulting from the pulse detonation synthesis process of the present invention. For example, numerous other materials, other than the oxides, carbides, and nitrides of the following examples can be synthesized using the present invention. Further, numerous other reactants 62 and detonable mixtures 64 than those shown in the following examples may also be employed in the present invention. Thus, it is intended that the present invention cover the various modifications and variations of the invention, provided they come within the scope of the appended claims and their equivalents.

EXAMPLES

Based upon the experimental work that has been conducted by the inventors, the inventors have identified the appropriateness of various materials that can be synthesized by the present invention for one particular application that requires a ceramic material that is thermally resistant, insulating, exhibits low thermal expansion, low thermal conductivity, and a high maximum use temperature. The relative performance of various of these synthesized materials on these several criteria is depicted in Table IV, which shows a relative valuing of these synthesized materials for the one particular application noted above, on a subjective scale of 1–8. In addition, numerous numerical analysis programs are available that can be used to compute the pulse detonation synthesis properties of various fuel/oxidizer mixtures 64. In the present preferred embodiment of the invention, the inventors used a numerical detonation analysis program known as "CHEETAH." "CHEETAH" was developed at Lawrence Livermore National Laboratory by L. E. Fried (1994). It is a derivative of the "TIGER" thermal chemical code and can be used to compute the products of a variety of single, as well as two phase, chemical equilibrium reactions. Both "CHEETAH" and "TIGER" solve thermodynamic equations between product series to find chemical equilibria. "CHEETAH" is an equilibrium code, so that the effect of physical non-idealities related to gas/solid interaction are not considered. The "CHEETAH" thermodynamic based data was initially configured to model solid phase explosive reactions. It has been extended to include reactants in products associated with ceramic materials, in particular aluminum. Additional species can easily be added for future work on other compositions within the scope of the present invention.

TABLE IV

Summary of calculations for trade-off study

| Mat'l | Market | Pot. cost savings | Ther. cond. | Ther. exp. | Max. use temp. | Flexural strength | Heat of form. | Total |
|---|---|---|---|---|---|---|---|---|
| $Si_3N_4$ | 8 | 5 | 0 | 8 | 2 | 8 | 0 | 34 |
| $Al_2O_3$ | 8 | 0 | 3 | 4 | 6 | 8 | 8 | 37 |
| BeO | 1 | 1 | 0 | 4 | 7 | 1 | 3 | 17 |
| MgO | 2 | 5 | 2 | 0 | 7 | 1 | 3 | 20 |
| $ZrO_2$ | 8 | 3 | 8 | 6 | 7 | 7 | 6 | 45 |
| $SiO_2$ | 5 | 0 | 8 | 4 | 0 | 1 | 4 | 22 |
| $Cr_2O_3$ | 1 | 8 | 4 | 4 | 6 | 2 | 6 | 31 |
| SiC | 8 | 2 | 3 | 7 | 3 | 8 | 0 | 31 |
| TiC | 6 | 0 | 3 | 5 | 3 | 3 | 1 | 21 |
| WC | 8 | 0 | 0 | 7 | 3 | 8 | 0 | 26 |

Table V shows the output from the typical run of the present invention in the "CHEETAH" program. This run represents an $Al/O_2$ detonation combustion calculation, where 19% excess weight percent $O_2$ has been added. The table lists the computed Chapman-Jouguet detonation conditions, just after the detonation wave, for this reaction. Only two limiting cases are summarized in Table V: 19% and 50% excess weight percent of $O_2$. The results in Table V show that detonation conditions are relatively insensitive to excess $O_2$. After detonation, the mixture cools and forms essentially 100% $Al_2O_3$, plus any remaining excess $O_2$. Aluminum oxide reactions, like most oxide reactions, are extremely exothermic and detonate relatively easily.

TABLE V

Results from limited computational study

| % excess $O_2$ by mass (atm) | Detonation velocity (m/sec) | Detonation temperature (°K.) | Detonation pressure (atm) |
|---|---|---|---|
| 19. | 1649. | 5086. | 35.5 |
| 50. | 1682. | 5007. | 33.6 |

A number of experiments were conducted to prove the concept of the Pulse Detonation Synthesis invention of the present application. The goal of these experiments was to prove that a representative fuel, aluminum, could be detonated using a controllable, repeatable process to produce a pure ceramic material, alumina. To achieve this goal, a quiescent mixture of aluminum and oxygen was detonated in a six inch combustor tube 20. The experimental design was inexpensive and simple. As the present inventors suspect will likely be the case in many commercial uses, the purity and morphology of the reactants 62 and the products were not tightly controlled.

Alumina was chosen for these examples based on its availability, cost of the precursor material, potential applicability to a wide range of engineering materials applications, and a relative wealth of empirical data from the available literature. It will be apparent to those skilled in the art, that modifications and variations can be made in the reactants and products of the present invention, all within the scope of the invention as claimed. These examples, therefore, are provided only by means of illustration and are exemplary and explanatory only. They are not restrictive of the invention as claimed. Rather, the drawings, and balance of the specification, illustrate various embodiments of the invention. Together with the detailed description, they serve to explain the principles of the present invention.

The experimental setup is shown in FIG. 13. It involved an eight foot long, 6" diameter combustor tube 20. Both ends of the combustor tube were capped using industrial blind flanges. Half the tube, the primary section 320 was filled with aluminum and oxygen while the other half, the driver or pre-ignition section 310 was filled with an easily detonable mixture of hydrogen and oxygen. The two sections were separated by a three mil thick, frangible polyester diaphragm or membrane 330. Both sections were initially at standard laboratory conditions: one atmosphere and 298° K. In a preferred embodiment of the present invention, the pre-ignition section 310, if used, would be substantially shorter, on the order of several inches long.

The aluminum oxygen mixture was injected through a piece of ⅜" stainless steel tubing inserted through the blind flange at the end of the primary section 320. The aluminum powder 62 was entrained in oxygen in a crude powder feeder. A convential industrial gas turbine spark ignitor was used as the ignitor means 80. This equipment was manufactured by B.F. Goodrich Aerospace and delivered a spark that was rated by the manufacturer at 1.7 Joules. In a preferred embodiment of the present invention, the inventors anticipate that higher energy ignitor means would be used. Detonation was confirmed at several stations along the combustor tube 20. Transducers 340 were placed at the end of the driver's section 310 and throughout the primary section 320.

Although there were slight variations, the test procedure was substantially the same in each example. First, diaphragm 330 was inserted between the two sections 310 and 320 of the reactor tube 20 and the fittings were tightened. Second, the flow rates for hydrogen and oxygen were set to produce a pre-mixed, stoichiometric mixture 64. This was accomplished by setting metering valves 70 from the reactant reservoirs 60 upstream of the reactor 20. The desired amount of aluminum powder 62 was measured using a laboratory balance manufactured by Ohause. A stoichiometric mixture of aluminum/oxygen at standard laboratory conditions (namely, 14.7 psi and 298° K.) was desired. For the volume of the four foot long pre-ignition section 310, a schedule 40 pipe used as the reaction chamber 50, 33 grams of aluminum powder was required. The powder was poured carefully into the feeder, and both ends were capped.

The mean powder size was 3 microns. High purity (99.7%) spherical aluminum powder was obtained, manufactured by Valimet, Inc. of Stockton, Calif. The purity, composition, and morphology of the pre-cursor aluminum powder was confirmed by a researcher at the University of California, at Davis. In a preferred embodiment of the present invention, the powder would be fluidized.

After filling the feeder, the outlet was attached to a closed ball valve 70 at the end of the reactor tube 20. The inlet was attached to a flexible hose. Once the system was closed, two vacuum lines on either side of the reactor tube 20 were open and both valves of the shock tube 50 were evacuated to roughly 0.10 psi. Once the initial pressure reached that level, the tube was filled with both reactant 62 and detonable mixture 64. Ignition was performed remotely. The gas valve flow was controlled using pneumatically acquated ball valves 70.

The driver, or pre-ignition section 310 was first filled with a stoichiometric mixture of aluminum/oxygen. For tests 1, 2 and 4, the driver was filled to roughly one atmosphere (14.7 psi). For test 6, the initial pressure was increased to two atmospheres (29.4 psi) to increase the energy of the incident's shock wave. Tests 3 and 4 were used to check the equipment. Next, the ball valve 70 to the primary section 320 was opened slowly to prevent the aluminum reactant 62 from being sucked into the evacuating primary portion 320 of reactant tube 20. The oxygen line was opened to fill the primary tube section. After filling, all gas lines were isolated, the ball valve 70 to the feeder was closed and the data acquisition system was armed. The driver mixture was ignited as soon as possible after filling to minimize separation of the reactant 62 and detonable mixture in the primary section 320. Preferably, this should occur within a minute. The ignition system was triggered manually, the data acquisition system was set to acquire and save data after sensing an electromagnetic pulse from the ignitor 80. After recording the pressure and storing in memory, the data acquisition system automatically downloaded the information to hard disk.

Figure 12:
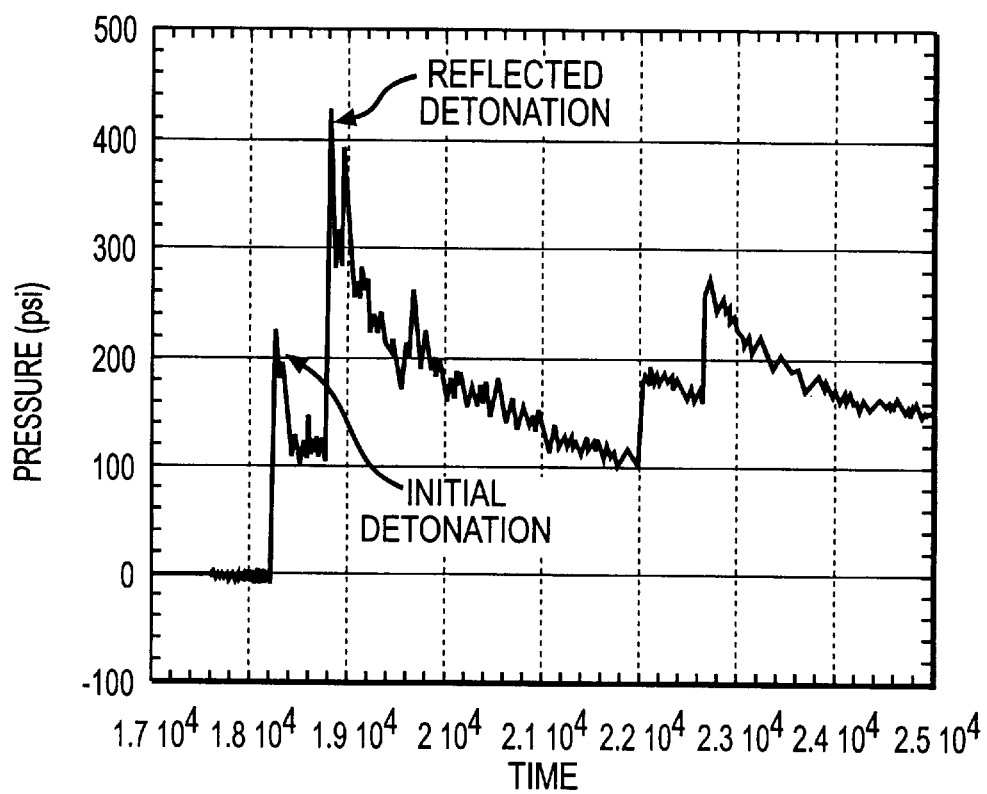
FIG. 12 is a sample pressure trace measured during the experimental work resulting in one of the examples of one embodiment of the present invention.
Figure 11A:
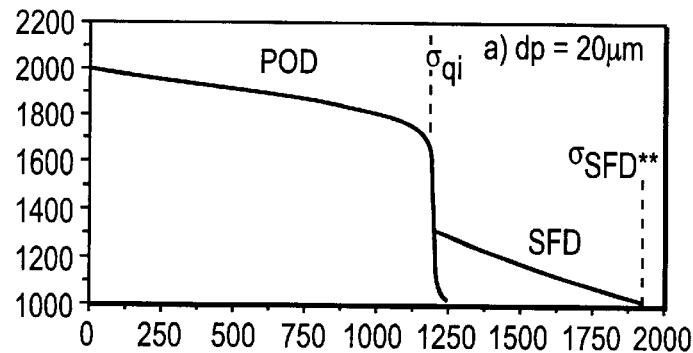
FIG. 11 is a series of graphs showing detonation regimes for an Al/$H_2$ mixture.
Figure 11B:
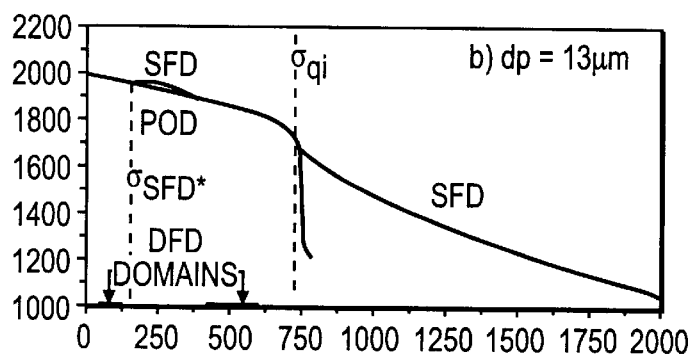
Figure 11C:
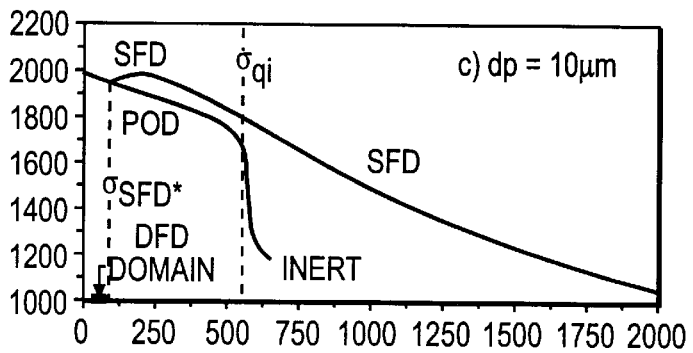
Figure 11D:
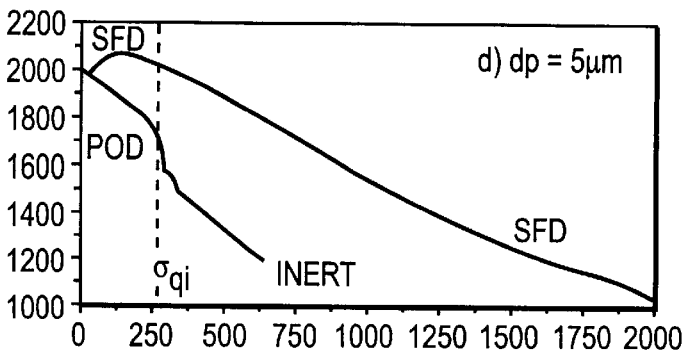

The results of these experiments are depicted in Tables VI, VII, and VIII. In addition, FIG. 12 indicates a sample pressure trace taken six inches from the end 40 of the primary section 320 of the combustion chamber 50 of the experimental set-up of the present invention. As shown in FIG. 12, each pressure spike represents a passing wave, either a detonation wave or a shock wave. As illustrated in FIG. 12, the path of the detonation wave can be traced by following the progression of the data points. The slope of the line between each point gives the velocity.

TABLE VI

Summary of results and conditions from tests to produce $Al_2O_3$

| Test number | Effective fuel density in shock tube, $\sigma$ (g/m³) | Predicted detonation shock velocity (m/sec) | Experimentally measured detonation velocity during first pass (m/sec) | Experimentally measured detonation velocity during second pass (m/sec) |
|---|---|---|---|---|
| 1 | 819 | 1725 | 847 | 1320 |
| 2 | 485 | 1785 | 1000 | 1429 |
| 4 | 749 | 1737 | 880 | 1228 |
| 6 | 815 | 1727 | 1381 | 1447 |

TABLE VII

Results from x-ray diffraction analysis of selected test samples

| | | Relative Composition (%) | | | |
|---|---|---|---|---|---|
| Sample Number | Sample Description | $\alpha$-$Al_2O_3$ | $\delta$-$Al_2O_3$ | $\gamma$-$Al_2O_3$ | Al |
| 15 | Powder collected from the end of the driver section after test 4 | 60.3 | 20.5 | 17.8 | 1.4 |
| 16 | Powder scraped from metal coil inserted in driver section, test 4 | 84.2 | 6.6 | 9.2 | <1 |
| 17 | Material collected from beginning of the primary section, test 6 | 13.2 | 21.4 | 18.9 | 46.5 |
| 25 | 4" long stainless steel tube inserted at end of primary section | <1 | <1 | <1 | >99 |
| 26 | Pre-cursor Al powder collected from drum | 0 | 0 | 0 | 100 |

TABLE VIII

Summary of morphology of material analyzed using SEM

| Sample Number | Material Morphology | Size (m) |
|---|---|---|
| 15 | Combination of spherical particles and sponge-like particles | 10 to 200 |
| 16 | Cracked coating | grain size 1 to 10 $\mu$m |
| 17 | Combination of spherical particles and sponge-like particles | |
| 26 | Agglomerated spheres | 1 to 3 |

The detonation velocities measured during four tests are summarized in Table VI. Average velocities for both the initial and reflected detonation waves are shown. Maximum possible fuel concentration is also shown. Final detonation velocities range from 1230 to 1450 meters per second, all within or near the range of velocities measured during previous studies, and clearly indicative of the presence of detonation.

For test number 6, the initial pressure in the driver section 310 was raised to two atmospheres before ignition. Detonation overpressures increase will initial pressure. The incident detonation from experiment number 6 provided a greater shock wave to the primary mixtures. For tests 1, 2 and 4 the incident detonation wave from the driver 310 had a peak pressure of approximately 300 psi. For test 6, the driver detonation wave had a peak pressure of approximately 600 psi. This higher pressure helped drive a wider range of the aluminum/oxygen mixture to detonate immediately, as shown by the velocity of the primary mixture in this table.

Some of the samples from tests 4 and 6 were shipped to the University of California at Davis for analysis of purity and powder morphology using x-ray diffraction (XRD) and scanning electron microscopy (SEM) techniques. Results from these analyses are presented in Table VII and VIII. Results from these analyses show that the two samples taken from test 4, sample numbers 15 and 16, were nearly completely converted to alumina. Each sample consisted of slightly different phases: αδγ. Both samples consisted many of α alumina, also known as corundum. Corundum is preferred for high temperature applications because it is most thermally stable form of alumina. Conventional thermospray techniques for application of alumina, such as plasma spraying, deposit alumina coatings consisting mainly of γ alumina. Corundum is more desirable because not only is it thermally stable, it is also the best phase at providing electrical insulation at high frequencies.

The above experimental examples show that the aluminum/oxygen mixture of one embodiment of the present invention was successfully detonated using staged ignition with a hydrogen/oxygen driver 64. The wave velocities in the aluminum/oxygen mixture varied from 800 m/sec to 1600 m/sec, well within reasonable limits for the mixture. The resulting reactions produced powders and coatings. Half of the particles were spherical while the rest of the particles were sponge-like. XRD analysis shows that a good portion of the converted synthesized material consists of corundum, the most desirable phase of aluminum.

It will be apparent to those skilled in the art that various modifications and variations can be made in the construction and configuration of various of the parts of the present invention, without departing from the scope or spirit of the invention. For example, the embodiments and experiments mentioned above are illustrative and explanatory only. Various changes can be made in the raw material reactants 62, the detonable mixtures 64, as well as in the configuration of the device 10 to engineer the materials to desired properties. Further, it may be appropriate to make additional modifications, such as the use of sensitizers, and other components, depending on the parameters sought to be achieved by the process. Thus, it is intended that the present invention cover the modifications and variations of the invention, provided them come within the scope of the appended claims and their equivalents.

We claim:

1. A process for synthesizing a powder material comprising:
    suspending at least one material reactant in a reactant gas inside at least one detonation chamber of a pulse detonation combustor; and
    initiating a pulsed supersonic shock wave-triggered detonation combustion wave in said at least one detonation chamber with a fuel source to form a synthesized powder material.

2. The process of claim 1, wherein said fuel source contains a fuel sensitizer additive.

3. The process of claim 1, wherein said at least one material reactant is a member selected from the group consisting of solids, gas, liquid, gel, and mixtures of these.

4. The process of claim 3, wherein said at least one material reactant is a two-phase suspension.

5. The process of claim 1, wherein said synthesized powder material is a ceramic powder.

6. The process of claim 1, wherein the synthesizing comprises modifying hazardous materials.

7. A process for synthesizing inorganic powder materials comprising:
    adding at least one reactant to a reaction chamber of a pulse detonation combustor;
    initiating detonation in said at least one reactant;
    propagating a detonation wave substantially through said at least one reactant; and
    said detonation substantially synthesizing the powder material.

8. The process of claim 7, wherein said synthesized powder material is selected from the group consisting of oxides, nitrides, carbides, and cermets.

9. The process of claim 7 wherein at least one reactant include silane and ammonia.

10. The process of claim 7, wherein said synthesized powder material is a nano scale powder.

11. The process of claim 7, further comprising collecting the powder material synthesized.

12. The process of claim 7, further comprising cooling the powder material synthesized.

13. The process of claim 7, wherein said at least one reactant further includes a fuel sensitizer additive.

14. The process of claim 7, wherein said at least one reactant is a two-phase suspension.

15. The process of claim 7, wherein said at least one reactant further comprises primary and secondary reactants.

16. The process of claim 7, wherein said at least one reactant further comprises primary and secondary reactants, and wherein said primary reactant is selected from the group consisting of solids, gas, liquid, gels, and mixtures of these.

17. The process of claim 7, wherein said at least one reactant further comprises primary and secondary reactants, and wherein said primary reactant is selected from the group consisting of silane, ammonium, Al, Ti, Zr, Mg, and mixtures of these.

18. The process of claim 7, wherein said at least one reactant further comprises primary and secondary reactants, and wherein said secondary reactant further comprises oxygen and a component selected from the group consisting of acetylene, propane, hydrogen, and mixtures of these.

19. The process of claim 18 wherein said primary reactant further comprises oxygen and a component selected from the group consisting of acetylene, propane, hydrogen, and mixtures of these.

20. The process of claim 7, wherein the synthesizing comprises modifying hazardous materials.

21. The process of claim 7, wherein said at least one reactant further comprises primary and secondary reactants, and wherein said secondary reactant further comprises oxygen and a component selected from the group consisting of hydrogen and hydrocarbon materials.

22. The process of claim 21 wherein said primary reactant further comprises oxygen and a component selected from the group consisting of hydrogen and hydrocarbon materials.

23. The process of claim 7, wherein said at least one reactant further comprises primary and secondary reactants, and wherein said secondary reactant further comprises any suitable oxidizer.

24. The process of claim 23 wherein said primary reactant further comprises any suitable oxidizer.

25. The process of claim 7, wherein said detonation further comprises substantially pseudogas detonation.

26. The process of claim 7, wherein said detonation further comprises substantially double front detonation.

27. The process of claim 7, wherein said detonation further comprises substantially single front detonation.

28. The process of claim 7, wherein said detonation further comprises some combination of one or more of the pseudogas, double front, and/or single front detonation.

29. A process for synthesizing a powder material, comprising:

filling a first portion of a combustion chamber with a first mixture capable of detonation;

filling a second portion of said combustion chamber with a second mixture capable of detonation;

activating an ignition means to initiate detonation;

initiating detonation within said first mixture;

propagating a detonation wave through said first mixture and into said second mixture;

initiating detonation in said second mixture;

modifying said second mixture in said second portion of said combustion chamber to synthesize the powder material; and exhausting the synthesized powder material from said combustion chamber.

30. The process of claim 29, wherein said first and second mixtures capable of detonation substantially the same composition.

31. The process of claim 29, wherein said ignition means comprises an electrical discharge.

32. The process of claim 29, wherein said powder material to be synthesized is a ceramic.

33. The process of claim 29, wherein the process is cycled repeatedly.

34. The process of claim 29, wherein said exhausting further comprises blowdown from propagation of an expansion wave in said combustion chamber following said detonation.

35. The process of claim 29, wherein said synthesized powder material is a nano-sized catalyst.

36. The process of claim 29, wherein one or more of said mixtures includes silane and ammonia.

37. The process of claim 29, wherein said synthesized powder material is a nano-scale powder.

38. The process of claim 29, further comprising collecting the synthesized powder material.

39. The process of claim 29, further comprising cooling the synthesized material.

40. The process of claim 29, wherein one or more of said mixtures further comprises a fuel sensitizer additive.

41. The process of claim 29, wherein one or more of said mixtures comprises a two-phase suspension.

42. The process of claim 29, wherein one or more of said mixtures further comprises primary and secondary reactants.

43. The process of claim 29, wherein one or more of said mixtures further comprises primary and secondary reactants, and wherein said primary reactant is selected from the group consisting of solids, gas, liquids, gels, and mixtures of these.

44. The process of claim 29, wherein one or more of said mixtures further comprises primary and secondary reactants, and wherein said primary reactant is selected from the group consisting of silane, ammonium, Al, Ti, Mg, Zr, and mixtures of these.

45. The process of claim 29, wherein one or more of said mixtures further comprises a reactant, comprising oxygen and a component selected from the group consisting of acetylene, propane, hydrogen, and mixtures of two or more of these.

46. The process of claim 29, wherein the synthesizing comprises modifying hazardous materials.

47. A process for synthesizing ceramic powder materials, comprising:

filling a combustion chamber with a first reactant;

adding a second reactant to said combustion chamber;

activating ignition means to initiate detonation;

initiating detonation within said combustion chamber;

propagating a detonation wave through said combustion chamber;

initiating detonation in said reactants;

modifying one or more of said reactants to synthesize the ceramic powder material; and exhausting the synthesized ceramic powder material from said combustion chamber.

48. The process of claim 47, wherein one or more of said reactants further comprises a microscopically divided component.

49. The process of claim 47, wherein one or more of said reactants further comprises a microscopically divided component, and further wherein said microscopically divided component is mixed substantially uniformly throughout said reactants.

50. The process of claim 47, wherein the process is cycled repeatedly.

51. The process of claim 47, wherein said first and second reactants are substantially the same composition.

52. The process of claim 47, wherein said ignition means comprises an electrical discharge.

53. The process of claim 47, wherein one or more of said reactants further comprises primary and secondary reactants, and wherein said secondary reactant further comprises oxygen and a component selected from the group consisting of hydrogen and hydrocarbon materials.

54. The process of claim 53, wherein said primary reactant further comprises oxygen and a component selected from the group consisting of hydrogen and hydrocarbon materials.

55. The process of claim 47, wherein one or more of said reactants further comprises primary and secondary reactants, and wherein said secondary reactant further comprises any suitable oxidizer.

56. The process of claim 55 wherein said primary reactant further comprises any suitable oxidizer.

57. The process of claim 47, wherein one or more of said reactants further comprises a mixture capable of detonation.

58. The process of claim 47, wherein said detonation is initiated within one or more of said reactants.

59. The process of claim 47, wherein one or more of said reactants further comprises a reactant and a mixture capable of detonation, and wherein said detonation is initiated within said mixture capable of detonation.

60. The process of claim 47, wherein one or more of said reactants further comprises a reactant and a mixture capable of detonation, and wherein said detonation is initiated within said reactant.

61. The process of claim 47, wherein said exhausting results from blowdown from propagation of an expansion wave in said combustion chamber following said detonations.

62. The process of claim 47, wherein said synthesized ceramic powder material is a nano-scale powder.

63. The process of claim 47, further comprising collecting the synthesized ceramic powder material.

64. The process of claim 47, further comprising cooling the synthesized ceramic powder material.

65. The process of claim 47, wherein one or more of said reactants further comprises a fuel sensitizer additive.

66. The process of claim 47, wherein one or more of said reactants comprises a two-phase suspension.

67. The process of claim 47, wherein one or more of said reactants further comprises primary and secondary reactants.

68. The process of claim 47, wherein one or more of said reactants further comprises primary and secondary reactants, and wherein said primary reactant is selected from the group consisting of solids, gas, liquids, gels, and mixtures of these.

69. The process of claim 68 wherein said secondary reactant is selected from the group consisting of solids, gas, liquids, gels, and mixtures of these.

70. The process of claim 47, wherein one or more of said reactants further comprises primary and secondary reactants, and wherein said primary reactant is selected from the group consisting of silane, ammonium, aluminum, and mixtures of these.

71. The process of claim 70 wherein said secondary reactant is selected from the group consisting of silane, ammonium, aluminum, and mixtures of these.

72. The process of claim 47, wherein one or more of said reactants further comprises primary and secondary reactants, and wherein said secondary reactant further comprises oxygen and a component selected from the group consisting of acetylene, propane, hydrogen, and/or mixtures of two or more of these.

73. The process of claim 72 wherein said primary reactant further comprises oxygen and a component selected from the group consisting of acetylene, propane, hydrogen, and mixtures of two or more of these.

74. The process of claim 47, wherein the synthesizing comprises modifying hazardous materials.

* * * * *